United States Patent
Lee et al.

(10) Patent No.: US 10,044,928 B2
(45) Date of Patent: Aug. 7, 2018

(54) MOBILE TERMINAL AND METHOD FOR CONTROLLING THE SAME

(71) Applicant: LG ELECTRONICS INC., Seoul (KR)

(72) Inventors: Hyunok Lee, Seoul (KR); Mansoo Sin, Seoul (KR); Hongjo Shim, Seoul (KR); Yoonwoo Lee, Seoul (KR); Mihyun Park, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 14/951,019

(22) Filed: Nov. 24, 2015

(65) Prior Publication Data

US 2017/0048450 A1 Feb. 16, 2017

(30) Foreign Application Priority Data

Aug. 10, 2015 (KR) .......................... 10-2015-0112692

(51) Int. Cl.
*H04N 5/232* (2006.01)
*G06F 3/00* (2006.01)
*G06F 3/0484* (2013.01)
*G06F 3/0488* (2013.01)
*G06F 3/0482* (2013.01)

(52) U.S. Cl.
CPC ....... *H04N 5/23216* (2013.01); *G06F 3/0482* (2013.01); *G06F 3/0488* (2013.01); *G06F 3/04842* (2013.01); *H04N 5/23229* (2013.01); *H04N 5/23293* (2013.01); *G06F 2203/04806* (2013.01); *H04N 5/23296* (2013.01)

(58) Field of Classification Search
CPC ........... H04N 5/23216; H04N 5/23296; H04N 5/23293; H04N 5/23219; G06F 3/04842
See application file for complete search history.

(56) References Cited

U.S. PATENT DOCUMENTS

| 7,948,549 B2 * | 5/2011 | Honjo ................ | H04N 5/23293 348/239 |
| 2006/0038908 A1 * | 2/2006 | Yoshino ............. | H04N 5/23293 348/333.11 |

(Continued)

FOREIGN PATENT DOCUMENTS

EP 2073110 6/2009

OTHER PUBLICATIONS

European Patent Office Application Serial No. 15003480.9, Search Report dated Jan. 9, 2017, 8 pages.

*Primary Examiner* — Jason A Flohre
(74) *Attorney, Agent, or Firm* — Lee Hong Degerman Kang & Waimey

(57) ABSTRACT

The present disclosure relates to a mobile terminal capable of displaying an image and a control method thereof. A mobile terminal according to an embodiment of the present disclosure may include a touch screen configured to display a first image, and a controller configured to control the touch screen to display a part of the first image in an enlarged manner based on a user request, wherein the controller displays a part of a second image different from the first image in an enlarged manner on the touch screen when a predetermined type of touch is applied to the touch screen in a state that the part of the first image is displayed in an enlarged manner.

16 Claims, 27 Drawing Sheets

(56) References Cited

U.S. PATENT DOCUMENTS

| | | | |
|---|---|---|---|
| 2006/0087520 A1 | 4/2006 | Ito et al. | |
| 2008/0025578 A1* | 1/2008 | Nozawa | H04N 5/23219 |
| | | | 382/118 |
| 2008/0279480 A1* | 11/2008 | Inamoto | H04N 5/23293 |
| | | | 382/305 |
| 2008/0297639 A1* | 12/2008 | Honjo | H04N 5/23293 |
| | | | 348/333.05 |
| 2008/0297640 A1* | 12/2008 | Honjo | H04N 5/23293 |
| | | | 348/333.05 |
| 2008/0303936 A1* | 12/2008 | Muramatsu | H04N 5/23293 |
| | | | 348/335 |
| 2012/0229678 A1* | 9/2012 | Okamoto | H04N 5/23219 |
| | | | 348/239 |
| 2013/0082960 A1 | 4/2013 | Otake et al. | |
| 2014/0085499 A1* | 3/2014 | Na | H04N 5/23293 |
| | | | 348/222.1 |
| 2014/0184858 A1* | 7/2014 | Yu | H04N 5/23293 |
| | | | 348/241 |
| 2015/0264253 A1* | 9/2015 | Takagi | H04N 5/23293 |
| | | | 348/333.11 |

* cited by examiner (a)　　　　　　　　　　(b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0112692, filed on Aug. 10, 2015, the contents of which is incorporated by reference herein in its entirety.

BACKGROUND OF THE INVENTION

1. Field of the Invention

The present disclosure relates to a mobile terminal capable of displaying an image and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, due to the development of terminal functions, displaying and viewing images (still images, moving images, etc.) through the terminal has been increased. As a result, the development of a user interface (UI)/user experience (UX) associated with image display for which the user's convenience is further taken into consideration has been actively carried out.

SUMMARY OF THE INVENTION

An aspect of the present disclosure is to provide a mobile terminal capable of displaying an image in an optimal method and a control method thereof.

Another aspect of the present disclosure is to provide a mobile terminal capable of providing a new user interface using a part of an image displayed in an enlarged manner and a control method thereof.

In order to accomplish the foregoing objective, a mobile terminal according to an embodiment of the present disclosure may include a touch screen configured to display a first image, and a controller configured to control the touch screen to display a part of the first image in an enlarged manner based on a user request, wherein the controller displays a part of a second image different from the first image in an enlarged manner on the touch screen when a predetermined type of touch is applied to the touch screen in a state that the part of the first image is displayed in an enlarged manner.

According to an embodiment, the first image and the second image may be images satisfying a predetermined condition.

According to an embodiment, the first image and the second image may be images consecutively captured for a predetermined period of time or images in which the color information of the first image and the second image are identical above a predetermined threshold value.

According to an embodiment, when the first image and the second image are not images satisfying the predetermined condition, the controller may display the whole of second image instead of a part of the second image on the touch screen based on the predetermined type of touch applied thereto.

According to an embodiment, the sizes of the first image and the second image may be the same, and the size and location of a part of the second image correspond to the size and location of a part of the first image.

According to an embodiment, the controller may recognize a graphic object contained in a part of the first image, and when at least a part of the recognized graphic object is not contained in a part of the second image, the location of a part of the second image may vary from the location of a part of the first image.

According to an embodiment, the controller may control the touch screen to display a part containing the recognized graphic object of the second image in an enlarged manner.

According to an embodiment, the size of a part of the second image may be maintained even when the location of a part of the second image varies from the location of a part of the first image.

According to an embodiment, when satisfying a predetermined condition in a state that a part of one image is displayed in an enlarged manner, the controller may link zoom-in information corresponding to the part of one image to the one image.

According to an embodiment, the mobile terminal may further include a communication unit configured to perform wireless communication with an external terminal, wherein when there is a display request of the one image linked to the zoom-in information from the external terminal, the controller displays a part of the one image corresponding to the zoom-in information on the external terminal.

According to an embodiment, when a touch linked to a zoom-in function is applied to the one image in a state that a plurality of zoom-in information are linked to the one image, the controller may display the nearest part to a position to which the touch is applied in an enlarged manner among a plurality of parts corresponding to the plurality of zoom-in information.

According to an embodiment, when the predetermined type of touch is applied in a state that a part corresponding to any one zoom-in information of a plurality of zoom-in information linked to the one image is displayed in an enlarged manner, the controller may perform a different operation according to a region to which the predetermined type of touch is applied.

According to an embodiment, the controller may display a part corresponding to zoom-in information different from the any one zoom-in information on the touch screen when the predetermined touch of touch is applied to a first region contained in the touch screen, and display the whole of the one image on the touch screen when the predetermined type of touch is applied to a second region different from the first region.

According to an embodiment, when the predetermined type of touch is applied in one direction in a state that a part corresponding to any one zoom-in information of a plurality of zoom-in information linked to the one image, the controller may display a part corresponding to zoom-in information located in a direction opposite to the one direction based on the any one zoom-in information.

According to an embodiment, when zoom-in information does not exist in a direction opposite to the one direction based on the any one zoom-in information, the controller may display an image different from the one image on the touch screen.

According to an embodiment, a thumbnail of the first image and a thumbnail of the second image may be displayed on the touch screen, and when a predetermined type of touch is applied to the thumbnail of the first image in a state that a part of the first image is displayed in an enlarged manner, the controller may display a part of the first image to overlap with the second image on the touch screen.

A control method of a mobile terminal according to an embodiment of the present disclosure may include displaying a first image, displaying a part of the first image in an enlarged manner based on a user request, and displaying a part of a second image different from the first image in an enlarged manner when a predetermined type of touch is applied to a touch screen in a state that a part of the first image is displayed in an enlarged manner.

According to an embodiment, the first image and the second image may be images satisfying a predetermined condition.

According to an embodiment, the first image and the second image may be images consecutively captured for a predetermined period of time or images in which the color information of the first image and the second image are identical above a predetermined threshold value.

According to an embodiment, when the first image and the second image are not images satisfying the predetermined condition, the whole of second image instead of a part of the second image may be displayed on the touch screen based on the predetermined type of touch applied thereto.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
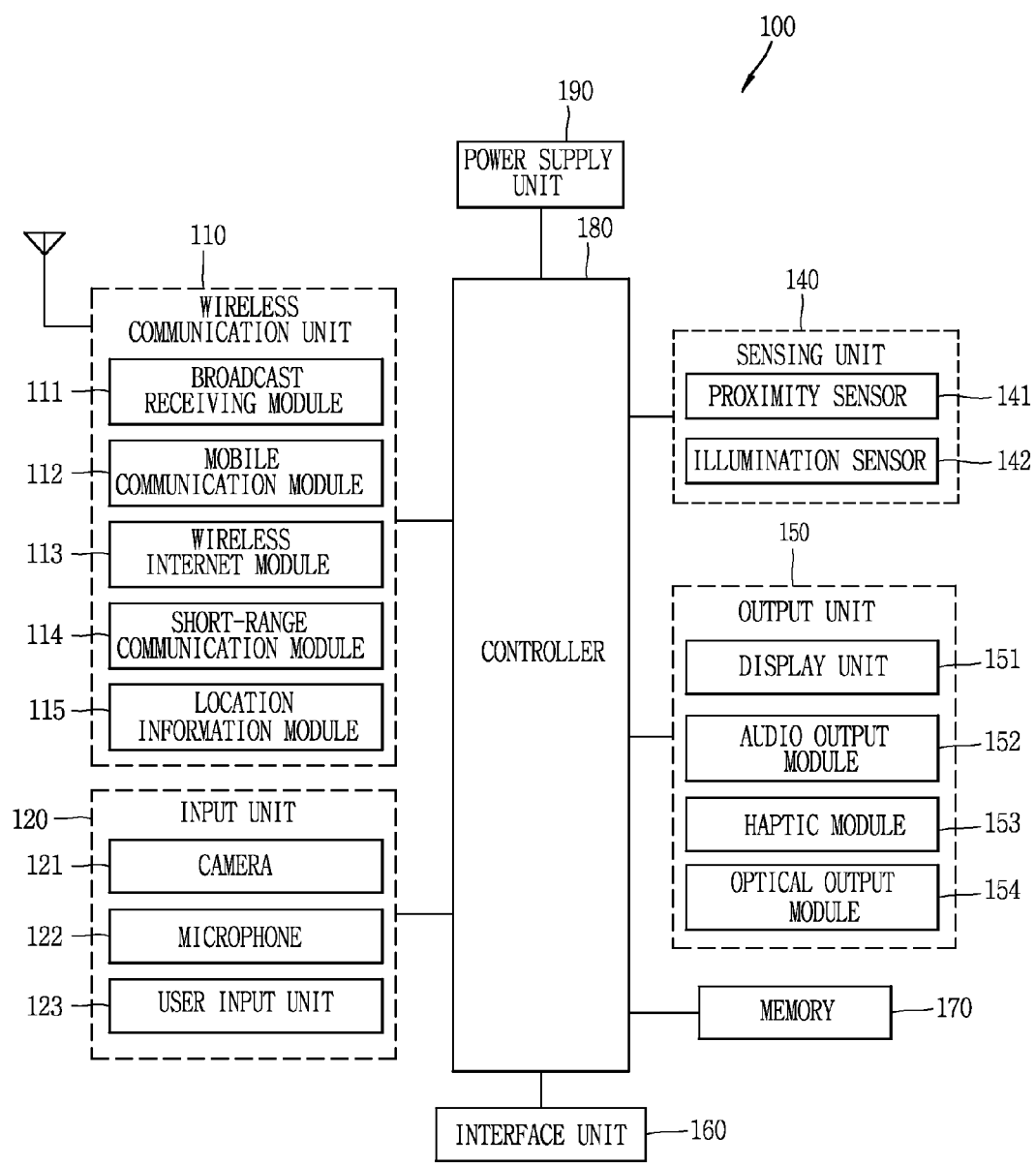
FIG. 1A is a block diagram for explaining a mobile terminal associated with the present disclosure.
Figure 1B:
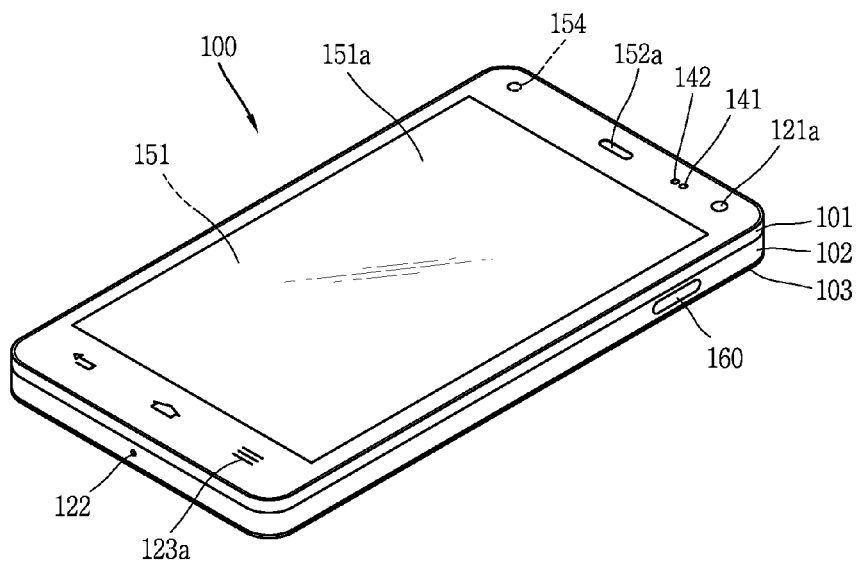
FIGS. 1B and 1C are conceptual views in which an example of a mobile terminal associated with the present disclosure is seen from different directions.
Figure 1C:
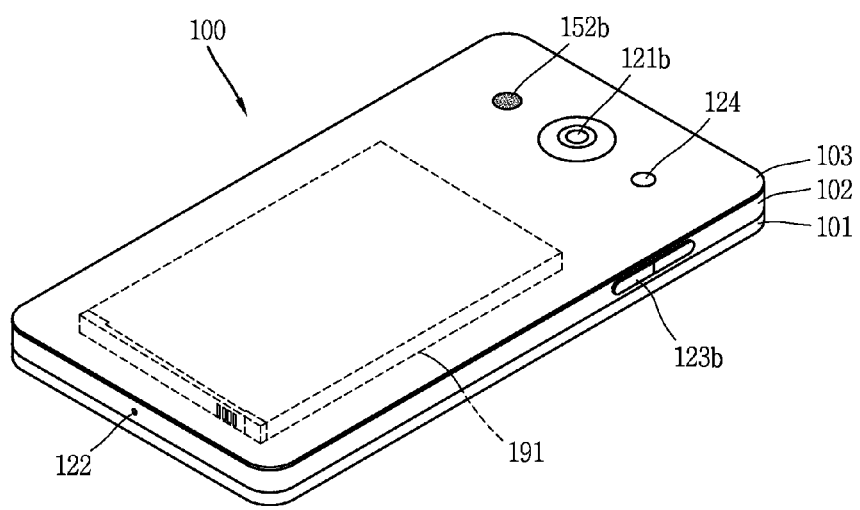

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

Furthermore, for 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit 152a. The stereoscopic processing unit 152a receives a 3D image to extract a left image and a right image from the 3D image, or receives a 2D image to convert it into a left image and a right image.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

The mobile terminal 100 according to an embodiment of the present disclosure capable of including at least one of the foregoing constituent elements may display an image on the touch screen 151. Specifically, the controller 180 may display an image on at least a part of the display region of the touch screen 151.

The display region of the touch screen 151 may correspond to a size of the touch screen 151 or may be smaller than that of the touch screen 151.

An image displayed on the touch screen 151 may include a still image, a moving image, a 3D stereoscopic image, and the like.

Furthermore, the controller 180 may display at least one image selected by a user among images received from an external server (or external terminal) through the wireless communication unit 110, images captured through the camera 121 or images stored in the memory 170.

On the other hand, according to the present disclosure, it may be possible to perform a zoom-in function for enlarging an image displayed on the touch screen 151 and a zoom-out function for reducing an enlarged image. Specifically, the controller 180 may display a part of any one image in an enlarged manner based on a predetermined type of touch (for example, a pinch-out touch, a double touch in which at least two touches are applied within a reference period of time, or the like) linked to a zoom-in function applied to the touch screen 151 (or the any one image) in a state that the any one image is displayed on the touch screen 151.

Here, displaying a part of the any one image in an enlarged manner may include the meaning of zooming in the any one image, enlarging the any one image, enlarging a display size of the any one image, or displaying only a part of the any one image on the touch screen 151 due to the enlargement of the display size of the any one image.

Furthermore, the controller 180 may display the whole of the any one image on the touch screen 151 in a reduced size of the any one image based on a predetermined type of touch (for example, a pinch-in touch, a double touch in which at least two touches are applied within a reference period of time, or the like) linked to a zoom-out function applied to the touch screen 151 (or a part of the any one image displayed in an enlarged manner) in a state that a part of the any one image is displayed in an enlarged manner.

On the other hand, according to the present disclosure, it may be possible to provide a user interface capable of immediately displaying an image different from any one image without any manipulation in an enlarged manner in a state that the any one image is enlarged.

Hereinafter, a method of immediately displaying an image different from any one image in an enlarged manner when displaying the different image displayed on the touch screen will be described in more detail with reference to the accompanying drawings.

Figure 2:
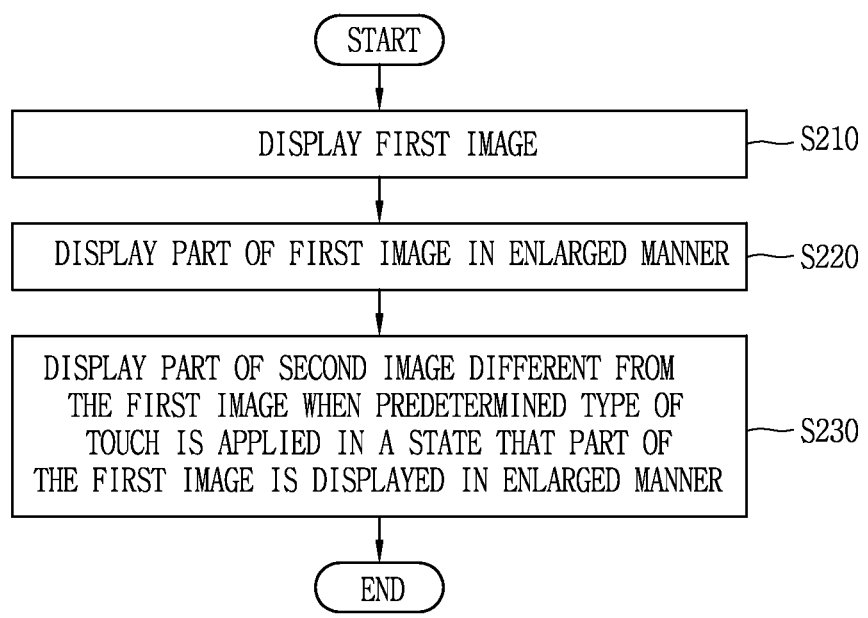
FIG. 2 is a flow chart for explaining a representative control method of the present disclosure.
Figure 3:
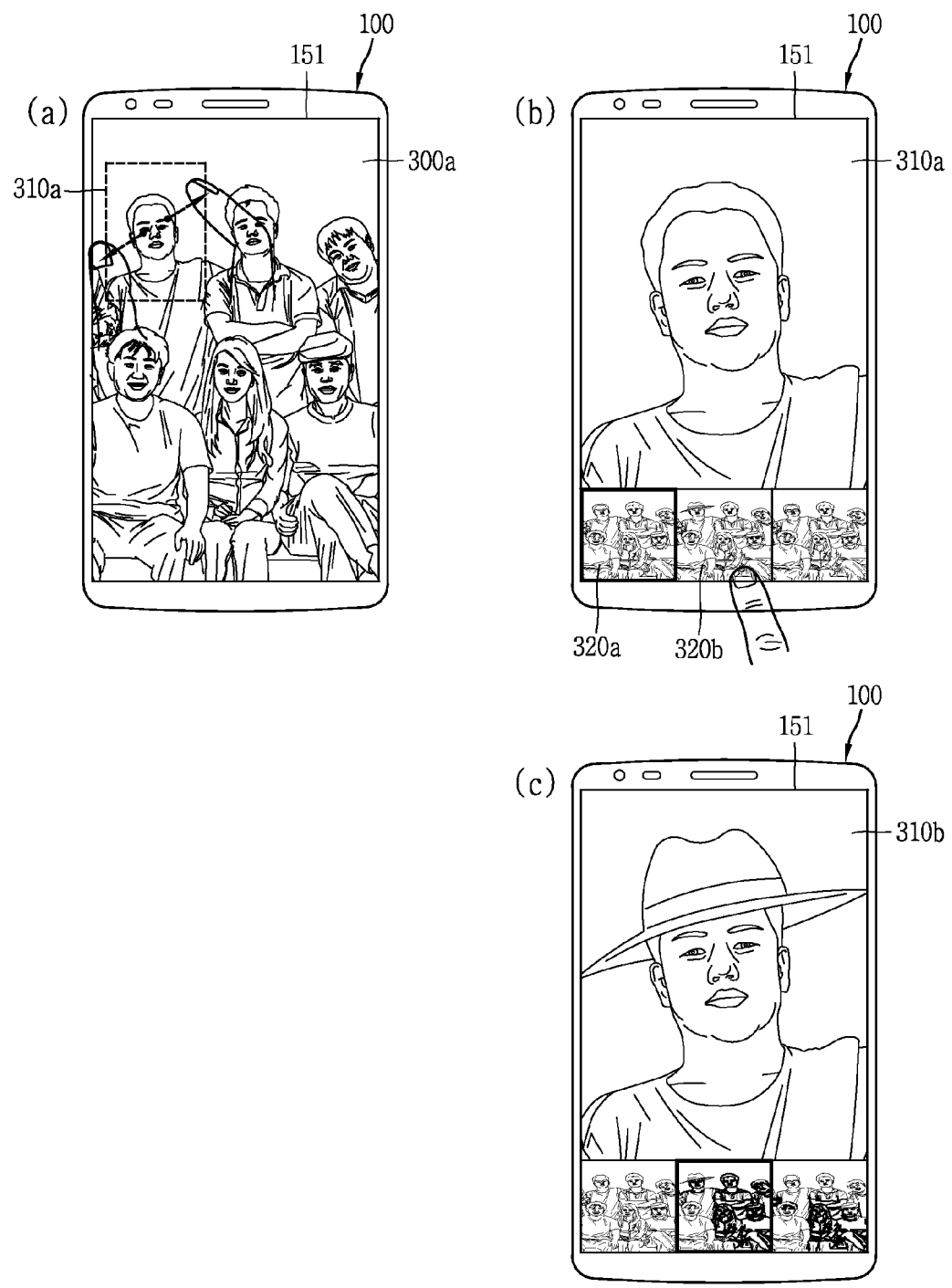
FIG. 3 is a conceptual view for explaining a control method illustrated in FIG. 2.

FIG. 2 is a flow chart for explaining a representative control method of the present disclosure, and FIG. 3 is a conceptual view for explaining a control method illustrated in FIG. 2.

Referring to FIG. 2, first, according to the present disclosure, the process of displaying a first image is carried out (S210). Specifically, the controller 180 may display a first image on the touch screen 151 based on a user request. At this time, the touch screen 151 may be in an ON state.

The first image may be an image received from an external server (or external terminal) through the wireless communication unit 110, an image captured through the camera 121, an image stored in the memory 170, or the like.

Furthermore, the first image may include a still image, a moving image, a 3D stereoscopic image, and the like.

In other words, the whole of the first image may be displayed on the touch screen 151.

Then, according to the present disclosure, the process of displaying a part of the first image in an enlarged manner is carried out (S220).

Specifically, the controller 180 may enlarge a first image based on a user request in a state that the first image is displayed on the touch screen 151. Due to this, a part of the first image may be displayed in an enlarged manner on the touch screen 151.

In other words, the controller 180 may control the a51 to display a part of the first image in an enlarged manner based on a user request.

The user request may be applying a predetermined type of touch linked to a zoom-in function to the touch screen 151 (or the first image), for an example.

The predetermined type of touch as a touch for performing a zoom-in function (or enlargement function) for enlarging an image may include various types of touches. For example, the various types of touches may include a short (or tap) touch, a long touch, a double touch, a multi touch, a drag touch, a flick touch, a pinch-in touch, a pinch-out touch, a swype touch, a hovering touch, and the like.

Hereinafter, the various types of touches will be described in more detail.

A short (or tap) touch may be a touch in which a touch subject (for example, a finger, a stylus pen, etc.) is in contact with the touch screen 151 (or a touch is applied) and then released within a predetermined period of time. For example, the short (or tap) touch may be a touch in which a touch subject is in contact with the touch screen for a short period of time like a single click of mouse.

A long touch may be a touch in which a touch subject is in contact with the touch screen 151 and then maintained for more than a predetermined period of time. For example, the long touch may be a touch in which a touch is applied to the touch screen 151 by a touch subject and then the touch is maintained for more than a predetermined period of time. More specifically, the long touch may be a touch in which the touch is maintained at one position on the touch screen for a predetermined period of time and then released therefrom. Furthermore, the long touch may be understood as a touch corresponding to a touch-and-hold operation in which the contact state of a touch subject is maintained on the touch screen 151 for more than a predetermined period of time.

A double touch may be a touch in which the short touch is consecutively applied to the touch screen 151 at least twice within a predetermined period of time.

A predetermined period of time described in the short touch, long touch and double touch may be determined by user's setting A multi touch may be a touch being applied to at least two contact positions on the touch screen 151 at substantially the same time point.

A drag touch may be a touch in which a contact started from a first position of the touch screen 151 is consecutively applied on the touch screen along one direction and then the contact is released from a second position different from the first position.

Specifically, the drag touch may be a touch applied to one position of the touch screen 151 by a touch subject being consecutively extended while being maintained on the touch screen 151 and then released from a position different from said one position.

Furthermore, the drag touch may denote a touch in which the touch is applied to one position of the touch screen 151 and then consecutively extended from the touch.

A flick touch may be a touch in which the drag touch is applied within a predetermined period of time. Specifically, the flick touch may be a touch in which a touch subject applying the drag touch is released from the touch screen 151 within a predetermined period of time. In other words, the flick touch may be understood as a drag touch applied at a speed above a predetermined speed.

A swipe touch may be a drag touch applied in a straight line.

A pinch-in touch may be a touch in which at least one of a first and a second touch applied to different two positions (separate two positions) on the touch screen 151 is extended in a direction closer to each other. For example, the pinch-in touch may be a touch implemented by an operation of decreasing a distance between two fingers in a state that the fingers are in contact with separate two positions, respectively, on the touch screen 151.

A pinch-out touch may be a touch in which at least one of a first and a second touch applied to different two positions (separate two positions) on the touch screen 151 is extended in a direction away from each other. For example, the pinch-out touch may be a touch implemented by an operation of increasing (extending) a distance between two fingers in a state that the fingers are in contact with separate two positions, respectively, on the touch screen 151.

A hovering touch may be a touch corresponding to the operation of a touch subject in a space away from the touch screen 151 while the touch subject is not in contact with the touch screen 151, and for an example, may be a proximity touch as illustrated in FIG. 1A. For example, the hovering touch may be a touch corresponding to an operation in which the touch subject is maintained at one position separated from the touch screen 151 for more than a predetermined period of time.

According to the present disclosure, it will be described that the preset type of touch is a pinch-out touch or double touch, for example. However, the present disclosure may not be necessarily limited to this, and the foregoing various types of touches will be implemented to perform a zoom-in function according to the user's setting.

Then, according to the present disclosure, the process of displaying a part of a second image different from the first image in an enlarged manner when a predetermined type of touch is applied in a state that a part of the first image is displayed in an enlarged manner is carried out (S230).

Specifically, when a predetermined type of touch is applied to the touch screen 151 (or a display request of a second image is received) in a state that a first image is enlarged, namely, in a state that a part of a first image is enlarged and displayed on the touch screen 151, the controller 180 may display a second image different from the first image on the touch screen 151.

At this time, the controller 180 may display a second image in an enlarged manner on the touch screen 151 without displaying the whole of the second image on the touch screen 151. Specifically, when a predetermined type of touch is applied in a state that a part of a first image is displayed in an enlarged manner, the controller 180 may control the touch screen 151 to immediately display a part of a second image in an enlarged manner without any additional touch (manipulation, request) other than the whole of the second image different from the first image.

The predetermined type of touch as a touch linked to a display function of a second image may include the foregoing various types of touches (for example, a short (or tap) touch, a long touch, a double touch, a multi touch, a drag touch, a flick touch, a pinch-in touch, a pinch-out touch, a swype touch, a hovering touch, etc.). The controller 180 may perform a different operation based on the operation status of the mobile terminal, the image display status of the touch screen or the like even when the same type of touch is applied.

Furthermore, the predetermined type of touch may include a touch applied to the thumbnail of a second image different from the first image. The thumbnail may denote a reduced image corresponding to any image or an image in which the display size of the any image is reduced.

When the first image and the second image are images satisfying a predetermined condition, the controller 180 may display a part of the second image in an enlarged manner on the touch screen 151 based on a predetermined type of touch applied in a state that a part of the first image is displayed in an enlarged manner. In other words, the first image and the second image may be images satisfying a predetermined condition.

For example, the first image and the second image may be images consecutively captured for a predetermined period of time or images in which the color information of the first image and the second image are identical above a predetermined threshold value.

The images consecutively captured within a reference period of time may denote a plurality of images captured by a consecutive capture function. Furthermore, the images in which the color information are identical above a predetermined threshold value may denote images similar images that have captured a specific subject within a reference range for a predetermined period of time other than a plurality of images captured by a consecutive capture function.

For another example, the first image and the second image may be images containing an image (graphic object) corresponding to substantially the same subject.

When the first image and the second image are not an image (or images) satisfying the predetermined condition, the controller 180 may display the whole of the second image instead of a part of the second image on the touch screen 151 based on a predetermined type of touch applied in a state that a part of the first image is enlarged.

Specifically, When the first image and the second image are not images satisfying the predetermined condition, the controller 180 may the whole of the second image (itself) without displaying a part of the second image even when a predetermined type of touch is applied in a state that a part of the first image is displayed in an enlarged manner.

The foregoing description will be more clearly understood with reference to FIG. 3.

As illustrated in FIG. 3A, a first image 300*a* may be displayed on the touch screen 151.

Then, when a predetermined type of touch (for example, a pinch-out touch) is applied to the touch screen 151 (or first image 300*a*) according to a user request as illustrated in FIG. 3A, the controller 180 may display part 310*a* of the first image 300*a* in an enlarged manner on the touch screen 151 as illustrated in FIG. 3B.

On the other hand, the thumbnail 320*a*, 320*b* (for example, thumbnails of images stored in the memory 170) of images that can be displayed on the touch screen 151 may be displayed on the touch screen 151.

The thumbnail 320*a*, 320*b* may be displayed in a partial region of the touch screen 151. Furthermore, the thumbnail 320*a*, 320*b* may be displayed on the touch screen 151 in various ways.

For example, the thumbnail 320*a*, 320*b* may be displayed based on the display of the first image or displayed based on a predetermined type of touch (for example, a short touch) applied in a state that the first image is displayed or displayed based on a part of the first image being displayed in an enlarged manner or displayed based on a predetermined type of touch (for example, a short touch) applied in a state that a part of the first image is displayed in an enlarged manner.

When a predetermined type of touch (for example, a short touch) is applied to a region other than a region displayed with the thumbnail in a state that the thumbnail is displayed, the controller 180 may allow the thumbnail to disappear from the touch screen.

When a predetermined type of touch is applied in a state that part 310*a* of the first image 300*a* is displayed in an enlarged manner (for example, a short touch is applied to a thumbnail 320*a* of the second image) as illustrated in FIG. 3B, the controller 180 may immediately display part 310*b* of the second image different from the first image 320*a* in a enlarged manner on the touch screen 151 as illustrated in FIG. 3C.

Through the foregoing configuration, when a user wants to view only his or her desired part (or an image (graphic object) corresponding to a subject desired to view by the user) in an enlarged manner for similar images, the present disclosure may provide a user interface capable of immediately displaying an image next to the image currently being displayed without performing an operation linked to a zoom-in function for each image.

On the other hand, as described above, when the first image and the second image are images satisfying a predetermined condition, the present disclosure may immediately display a part of the second image in an enlarged manner based on a display request of the second image being received in a state that a part of the first image is enlarged.

Hereinafter, images satisfying a predetermined condition will be described with reference to the accompanying drawings.

Figure 4A:
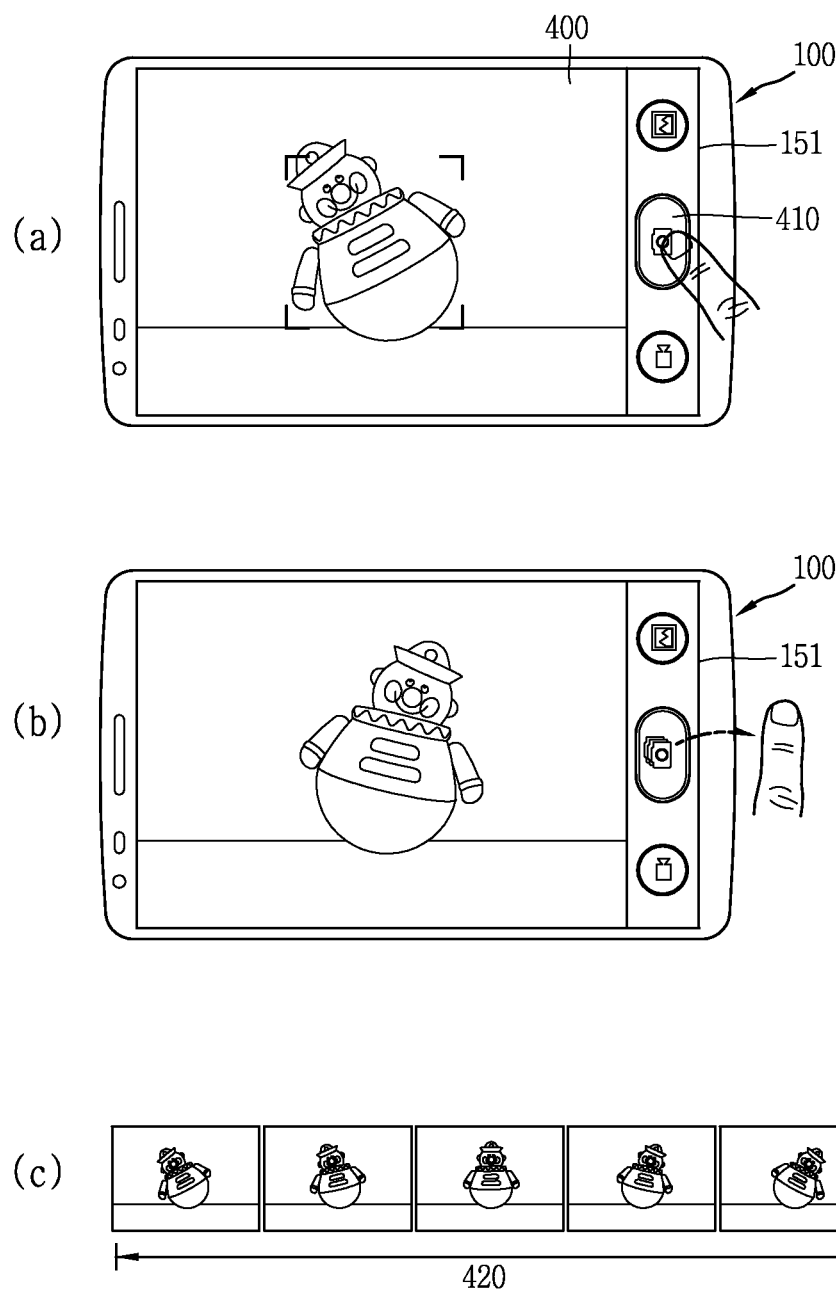
FIGS. 4A, 4B and 4C are conceptual views for explaining images satisfying a predetermined condition according to an embodiment of the present disclosure.
Figure 4B:
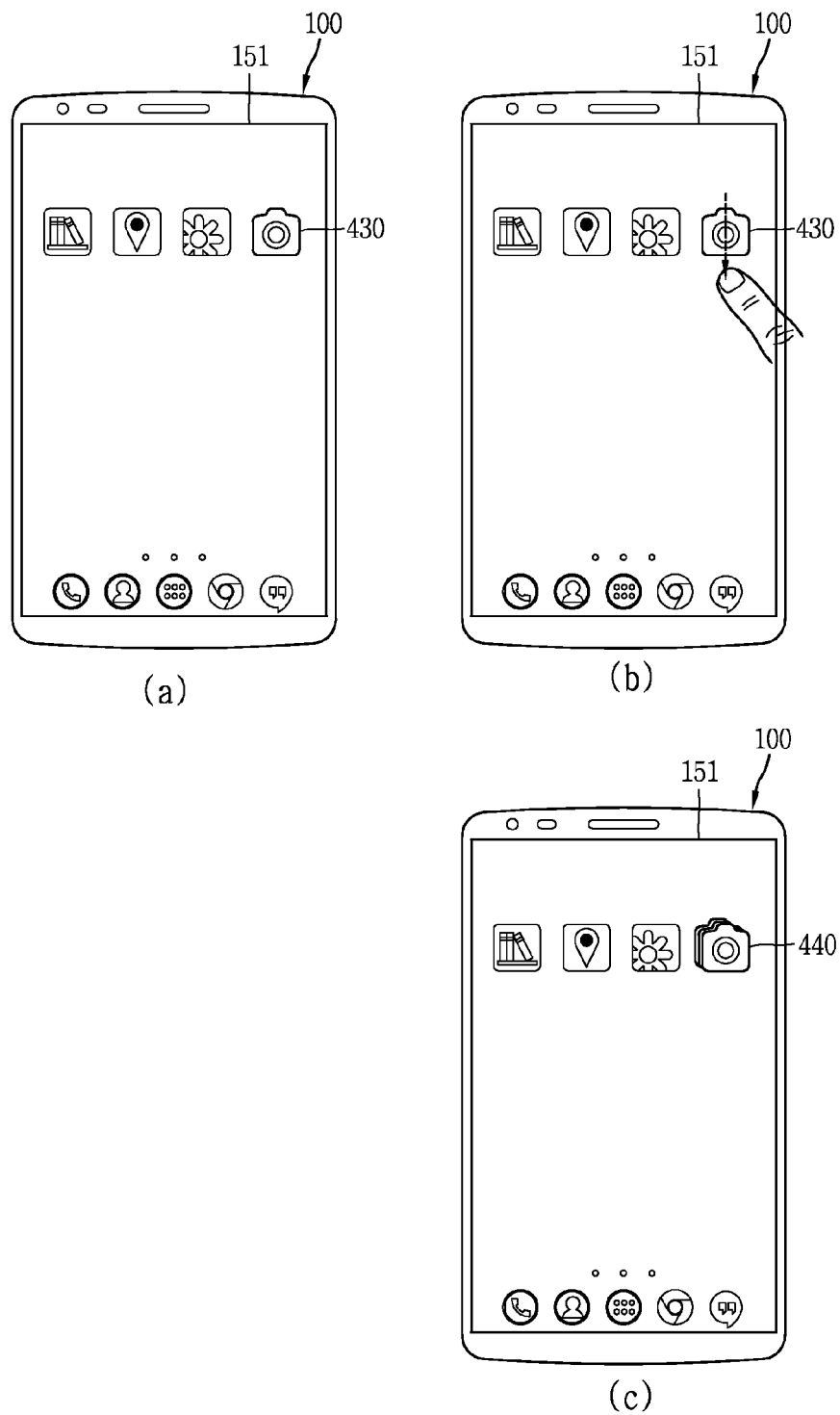
Figure 4C:
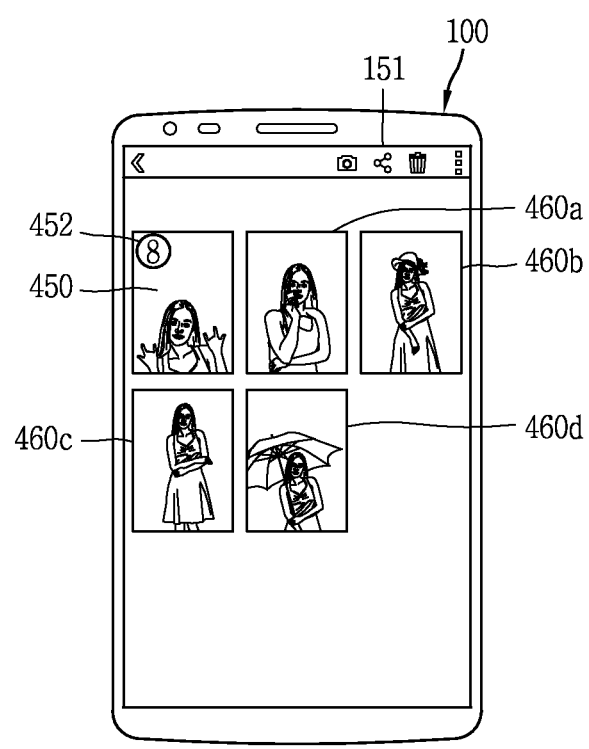

FIGS. 4A, 4B and 4C are conceptual views for explaining images satisfying a predetermined condition according to an embodiment of the present disclosure.

A mobile terminal associated with the present disclosure may perform a consecutive capture function. The consecutive capture function may be a function of consecutively capturing a preview image received through the camera 121 a plural number of times within a reference period of time. Furthermore, the consecutive capture function may be a function of consecutively capturing a preview image received through the camera 121 for a user's desired period of time. A plurality of images captured by the consecutive capture function may be images satisfying a predetermined condition according to an embodiment of the present disclosure.

For example, as illustrated in FIG. 4A(a), a preview image 400 received through the camera 121 (refer to FIG. 1A) may be displayed on the touch screen 151. The preview image 400 may be executed based on an icon (or an icon of an application) linked to an image capture function being selected (touched). When an image capture function is carried out based on the selection of an icon, the touch screen 151 may be in an ON state.

The preview image 400 refers to an image received in real time through the camera 121. In other words, a preview image (or screen information (or graphic object) contained in the preview image) received through the camera 121 may be changed based on the movement of the mobile terminal 100 by an external force and the movement of objects (or subjects) existing within an angle of view of the camera 121 or the like.

Furthermore, a graphic object 410 linked to a function of capturing the preview image 400 may be displayed along with the preview image 400 on the touch screen 151. When a touch is applied to the graphic object 410, the controller 180 may capture the preview image 400. The captured image may be stored in the memory 170.

On the other hand, the controller 180 may perform a consecutive capture function performing a plurality of captures for a predetermined period of time based on a predetermined type of touch applied to the graphic object 410.

For example, as illustrated in FIG. 4A(a), when a touch is applied to the graphic object 410 and then maintained for a predetermined period of time without being released (a long touch is applied), the controller 180 may consecutively perform a plurality of captures while maintaining the touch.

Then, when the touch that has been maintained is released as illustrated in FIG. 4A(b), the controller 180 may store the plurality of captured images 420 in the memory 170 while maintaining the touch as illustrated in FIG. 4A(c).

The plurality of images 420 may be images satisfying a predetermined condition described in the present disclosure.

For another example, an icon (or an icon of an application) 430 corresponding to an image capture function may be displayed on the touch screen 151 as illustrated in FIG. 4B(a). As illustrated in FIG. 4B(b), a predetermined type of touch (for example, a drag touch (or flick/swype touch) applied to pass through the icon 430) may be applied to the icon 430. In this case, as illustrated in FIG. 4B(c), the controller 180 may change the icon 430 corresponding to the image capture function to an icon 440 corresponding to a consecutive capture function.

When the icon 440 corresponding to the consecutive capture function is selected (or touched), the controller 180 may activate the camera 121, and display a preview image received through the camera 121 on the touch screen 151. Then, when a capture request is applied, the controller 180 may consecutively perform a plural number of captures (a predetermined number of times) for a certain period of time, and store a plurality of images generated by the plural number of captures in the memory 170.

Similarly, the plurality of images may be images satisfying a predetermined condition described in the present disclosure.

Furthermore, the images satisfying a predetermined condition may include images in which the color information of a plurality of images are identical above a predetermined threshold value as described above.

The images in which the color information are identical above a predetermined threshold value may denote similar images that have captured a specific subject within a reference range for a certain period of time other than a plurality of images captured by a consecutive capture function.

Furthermore, the images satisfying a predetermined condition may be images containing an image (graphic object) corresponding to substantially the same subject.

The images satisfying a predetermined condition associated with the present disclosure may be displayed on the touch screen 151 as illustrated in FIG. 4C.

A screen illustrated in FIG. 4 may be a screen for selecting images stored in the memory 170 (or a screen displayed when selecting an icon linked to an image display function (gallery function)).

As illustrated in FIG. 4C, a thumbnail 450 corresponding to any one of a plurality of images captured by a consecutive capture function may be displayed on the touch screen 151. In other words, a plurality of images (images satisfying a predetermined condition) captured by the consecutive capture function may be grouped into one group.

The controller 180 may display only a thumbnail 450 corresponding to any one of images satisfying a predetermined condition on the touch screen 151 to secure a display region (or to more conveniently manage images satisfying a predetermined condition). The any one image may be the most lately captured image among the images satisfying a predetermined condition, for an example. The controller 180 may display an indicator 452 indicating a number of images satisfying the predetermined condition along with the thumbnail 450. The indicator 452 may be displayed to overlap with the thumbnail 450, for an example.

Though not shown in the drawing, when the thumbnail 450 is selected, the controller 180 may display thumbnails corresponding to images satisfying the predetermined condition, respectively, on the touch screen 151.

However, the present disclosure may not be necessarily limited to this, and the controller 180 may display thumbnails 460a, 460b, 460c, 460d corresponding to images satisfying a predetermined condition, respectively, on the touch screen 151.

When any one of the thumbnails 460a, 460b, 460c, 460d is selected, the controller 180 may control the touch screen 151 to display all images corresponding to the selected thumbnail.

The foregoing thumbnails may be changed based on a specific operation being carried out. For example, when a part of an image corresponding to any one thumbnail is displayed in an enlarged manner and then returned again to a screen for selecting the any one thumbnail, the any one thumbnail may be changed to an image corresponding to a part of the image.

Hereinafter, a method of enlarging an image according to an embodiment of the present disclosure will be described in more detail with reference to FIG. 5.

Figure 5:
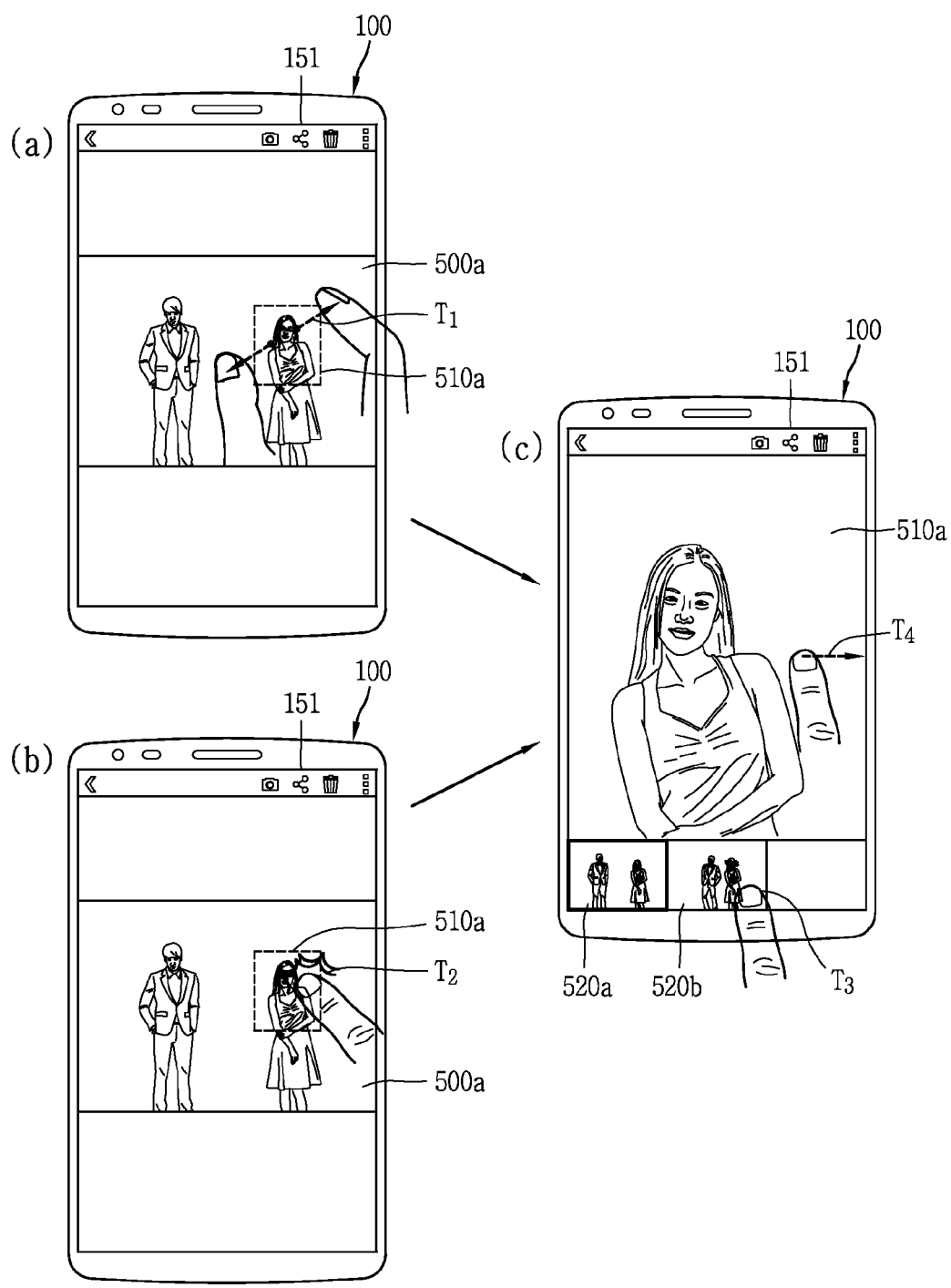
FIG. 5 is a conceptual view for explaining a method of enlarging an image according to an embodiment of the present disclosure.

FIG. 5 is a conceptual view for explaining a method of enlarging an image according to an embodiment of the present disclosure.

A mobile terminal associated with the present disclosure may enlarge an image based on various types of touches. Specifically, the controller 180 may display part 510a of a first image 500a in an enlarged manner on the touch screen 151 based on a predetermined type of touch applied to the first image 500a.

For example, the predetermined type of touch may be a pinch-out touch (T1). As illustrated in FIG. 5A, a pinch-out touch (T1) may be applied to the first image 500a displayed on the touch screen 151 as illustrated in FIG. 5A. In this case, the controller 180 may display part 510a of the first image 500a in an enlarged manner on the touch screen 151, as illustrated in FIG. 5C, based on a position to which the extent of the pinch-out touch (T1) is applied and the extent at which the pinch-out touch (T1) is applied.

For another example, the predetermined type of touch may be a double touch (T2) in which at least two times of short touches are applied within a reference period of time. The reference period of time may be determined by user setting.

As illustrated in FIG. 5B, a double touch (T2) may be applied to the first image 500a displayed on the touch screen 151. In this case, the controller 180 may display part 510a of the first image 500a in an enlarged manner, as illustrated in FIG. 5C, based on a position to which the double touch (T2) is applied.

Here, the size of the part 510a of the first image displayed in an enlarged manner may vary according to the kind of the predetermined type of touch.

For example, as illustrated in FIG. 5A, when the pinch-out touch (T1) is applied, the size of the part 510a of the first image may vary based on the extent at which the pinch-out touch (T1) is applied. For example, as the extent of the pinch-out touch (T1) increases, the size of the part 510a of the first image may decrease. In other words, the extent of the pinch-out touch (T1) increases, the first image may be further enlarged.

For another example, as illustrated in FIG. 5B, when the double touch (T2) is applied, the controller 180 may enlarge the first image by a predetermined size around a position to which the double touch (T2) is applied. In other words, the size of a part of the first image enlarged by the double touch may be constant.

In addition, the present disclosure may enlarge the first image in various ways.

On the other hand, the present disclosure may display a second image different from the first image on the touch screen 151 based on a predetermined type of touch applied in a state that the part 510a of the first image is displayed in an enlarged manner.

For example, as illustrated in FIG. 5C, the predetermined type of touch may be a short touch (T3) applied to a thumbnail 520b corresponding to the second image or a flick touch (T4) applied to the enlarged part 510a.

When a drag touch applied at a speed below a predetermined speed is applied to the enlarged part 510a, the controller 180 may display a part different from the part of the first image. In other words, when the drag touch is applied, the controller 180 may move the enlarged first image 500a.

On the other hand, when a drag touch (flick touch (T4)) applied at a speed above a predetermined speed is applied, the controller 180 may display a second image different from the first image 500a on the touch screen 151, instead of moving the first image 500a.

Here, according to the present disclosure, when the first image and the second image are images satisfying a predetermined condition described in FIGS. 4A through 4C, it may be possible to immediately display a part of the second image in an enlarged manner on the touch screen 151 based on the predetermined type of touch.

Hereinafter, a method of immediately displaying a part of the second image in an enlarged manner will be described in more detail with reference to FIGS. 6A through 6C.

Figure 6A:
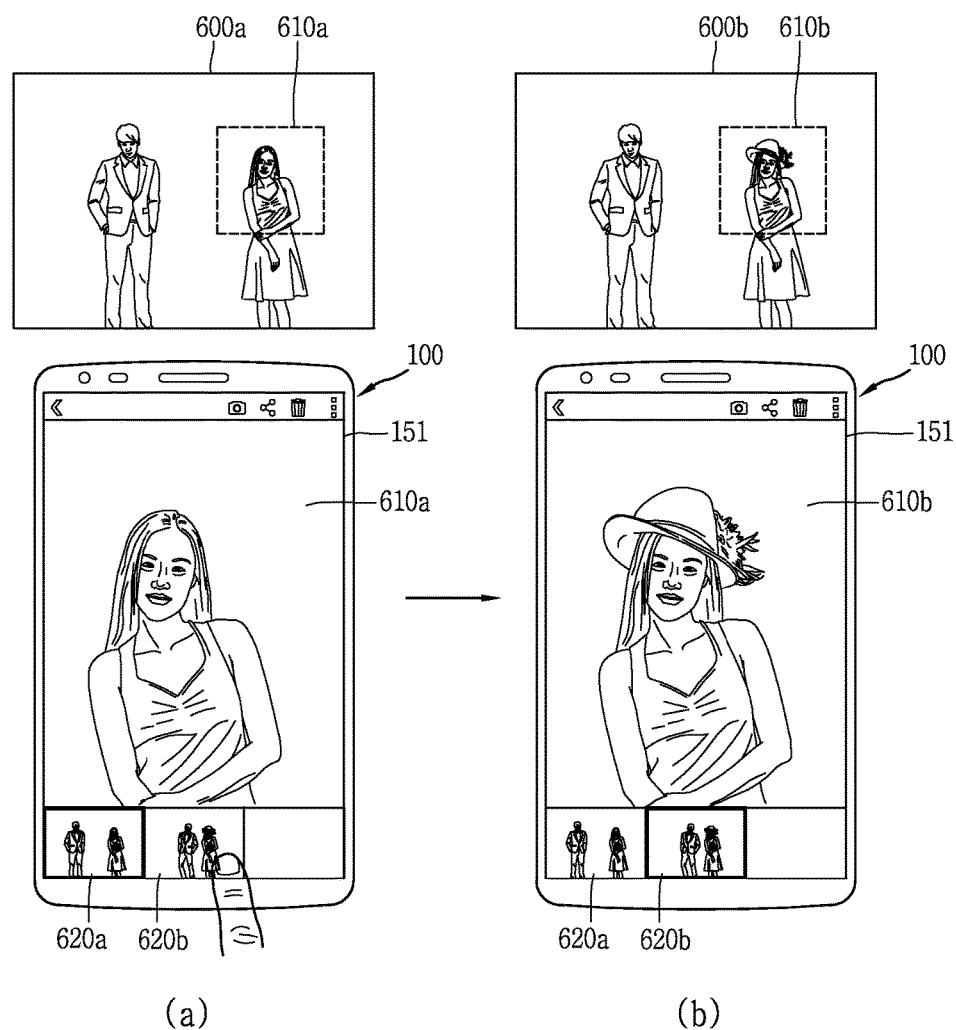
FIGS. 6A, 6B and 6C are conceptual views for explaining a method of displaying a part of a second image in an enlarged manner in a state that a part of a first image is enlarged.
Figure 6B:
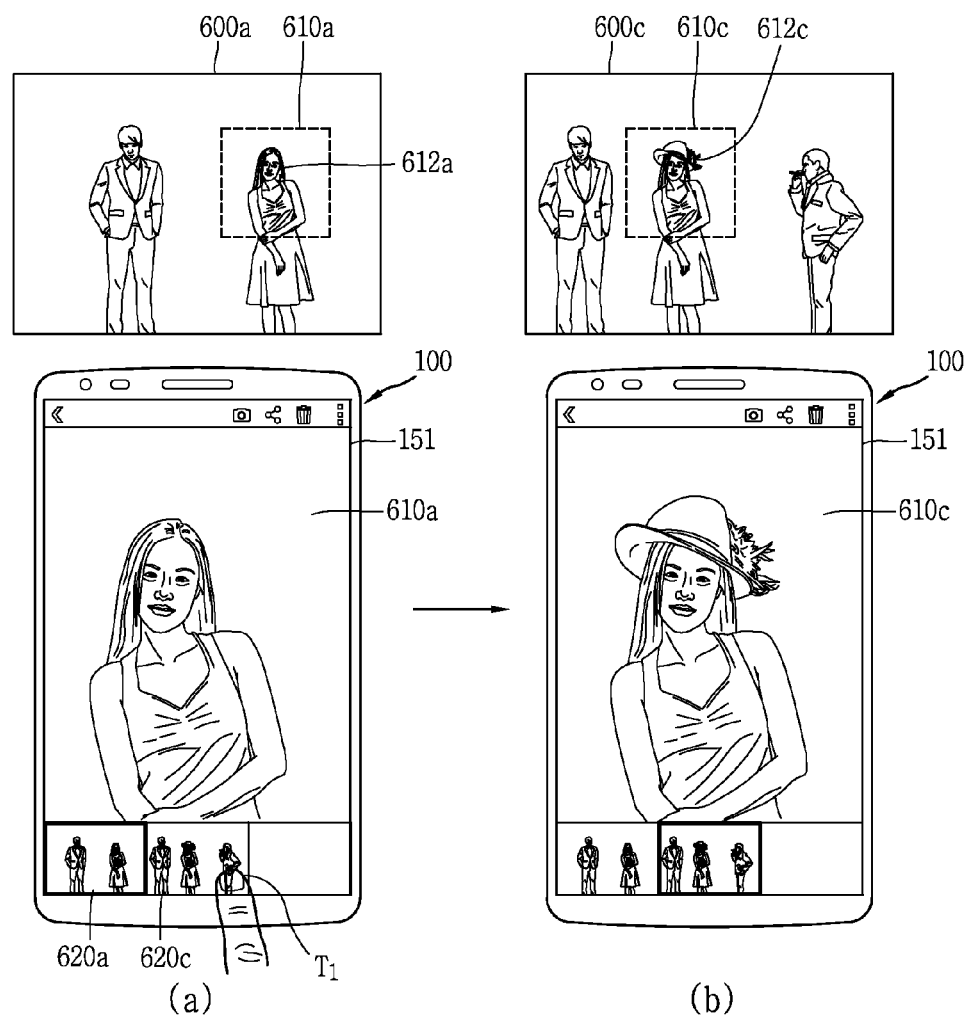
Figure 6C:
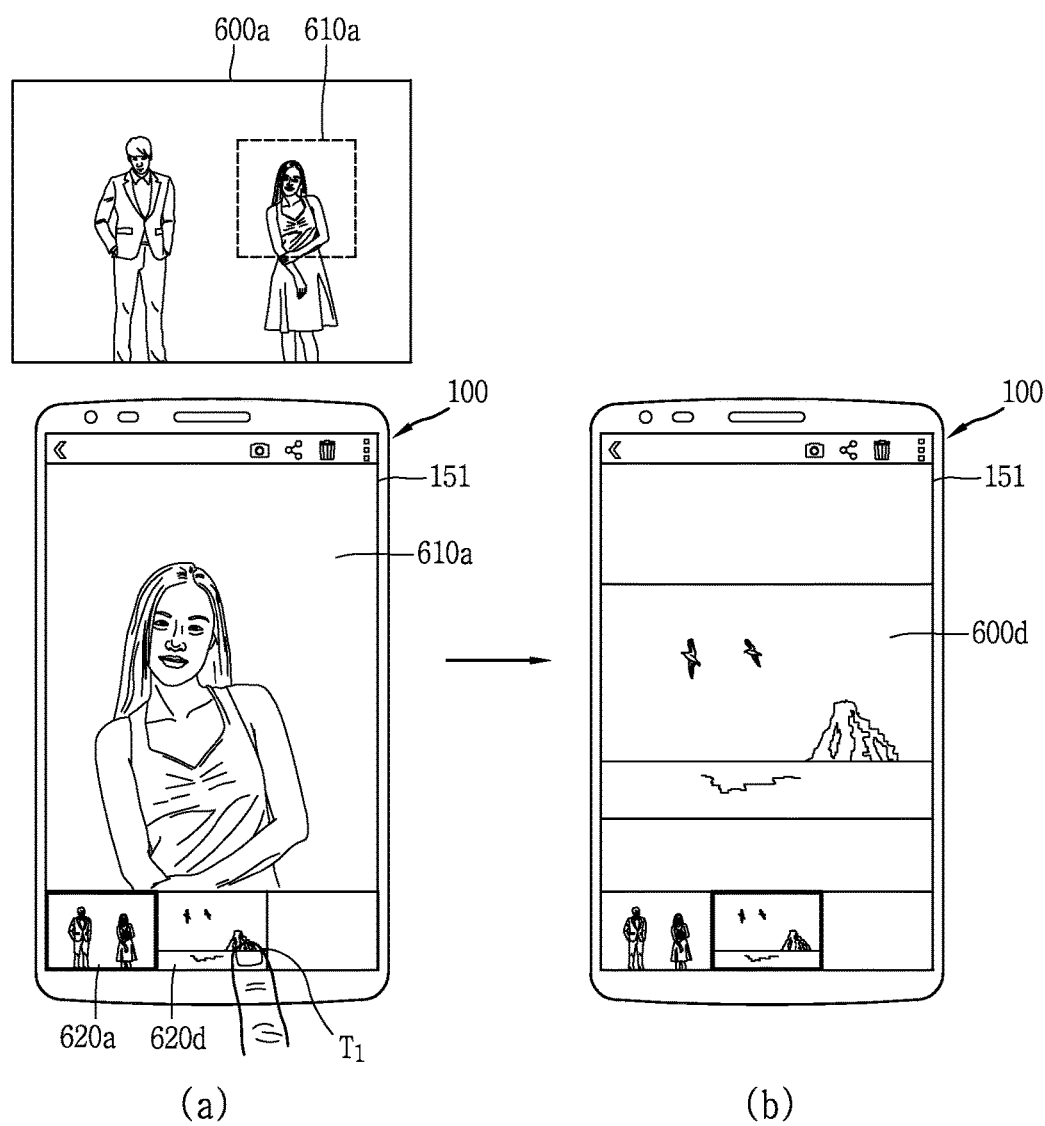

FIGS. 6A, 6B and 6C are conceptual views for explaining a method of displaying a part of a second image in an enlarged manner in a state that a part of a first image is enlarged.

Referring to FIG. 6A, a predetermined type of touch may be applied to the touch screen 151 in a state that part 610a of the first image 600a is displayed in an enlarged manner on the touch screen 151 as illustrated in FIG. 6A(a) (for example, a touch may be applied to a thumbnail 620b of the second image). In this case, as illustrated in FIG. 6A(b), the controller 180 may control the touch screen 151 to immediately display part 610b of the second image 600b different from the first image 600a on the touch screen 151 based on the predetermined type of touch being applied thereto.

Here, the first image 600a and the second image 600b may be images satisfying a predetermined condition. Specifically, the sizes of the first image 600a and second image 600b may be the same.

Furthermore, the size and location of the part 610b of the second image 600b may correspond to those of the part 610a of the first image 600a as illustrated in FIG. 6A. In other words, the size of the part 610a of the first image 600a displayed in an enlarged manner and the size of the part 610b of the second image 600b displayed in an enlarged manner may be the same. In other words, the controller 180 may apply the extent (magnification factor) of enlarging the first image 600a and second image 600b in the same manner.

Furthermore, the oil pump 190 may set (determine) the location of part of the second image 600b displayed in an enlarged manner to the same location as the location of a part of the first image 600a displayed in an enlarged manner. On the other hand, referring to FIG. 6B, the controller 180 may recognize a graphic object 612a contained in the part 610a of the first image 600a. The graphic object 612a may be an image corresponding to a subject contained in the first image 600a. The recognition is enabled through image analysis. A method (algorithm) of performing image analysis is not related to the gist of the present disclosure, and the detailed description thereof will be omitted.

Then, when a predetermined type of touch is applied in a state that the part 610a of the first image 600a is displayed in an enlarged manner, the controller 180 determines whether or not the recognized graphic object is contained in part 610c of the second image 600c corresponding to the part 610a.

As illustrated in FIG. 6B(b), when at least a part of the recognized part 610c is not contained in the part 610c of the second image 600c corresponding to the part 610a, the location of the part 610c of the second image may be different from that of the part 610a of the first image.

In other words, the controller 180 may control the touch screen 151 to display the part 610c containing the recognized graphic object 612c of the second image 600c in an enlarged manner. Specifically, the controller 180 may determine a graphic object 612c corresponding to a graphic object 612a recognized from the part 610a of the first image on the second image 600c, and display the part 610c containing the graphic object 612c of the second image 600c in an enlarged manner on the touch screen 151.

The description of FIG. 6B may be understood to set the location of an enlarged region in a different manner through face recognition or object recognition.

Here, the size of the part 610c of the second image may be maintained even when the location of the part 610c of the second image is different from the location of the part 610a of the first image as illustrated in FIG. 6B. In other words, even though the part 610c of the second image that does not correspond to the part 610a of the first image is displayed in an enlarged manner when enlarging the second image, the controller 180 may maintain the size of the part 610c of the second image to be the same as that of the part 610a of the first image. In other words, the controller 180 may maintain the extent (magnification factor) of enlargement to be the same even though the enlarged portions of the first image 600a and second image 600c are different.

Through the foregoing configuration, when the location at which a subject is captured varies even though there are images satisfying a predetermined condition, the present disclosure may provide a user interface capable of tracking and immediately displaying it in an enlarged manner.

On the other hand, as illustrated in FIG. 6C, when the first image 600a and the second image 600d are not images satisfying a predetermined condition, a predetermined type of touch may be applied to the touch screen 151 on which the part 610a of the first image 600a is displayed in an enlarged manner. In this case, as illustrated in FIG. 6C(b), the controller 180 may display the whole of the second image 600d on the touch screen 151 without displaying a part of the second image 600d in an enlarged manner based on the predetermined type of touch being applied thereto.

On the other hand, the present disclosure may store information associated with a region displayed in an enlarged manner, namely, zoom-in information, in connection with an image. Hereinafter, a method of displaying an image in various ways using zoom-in information will be described in more detail with reference to the accompanying drawings.

Figure 7A:
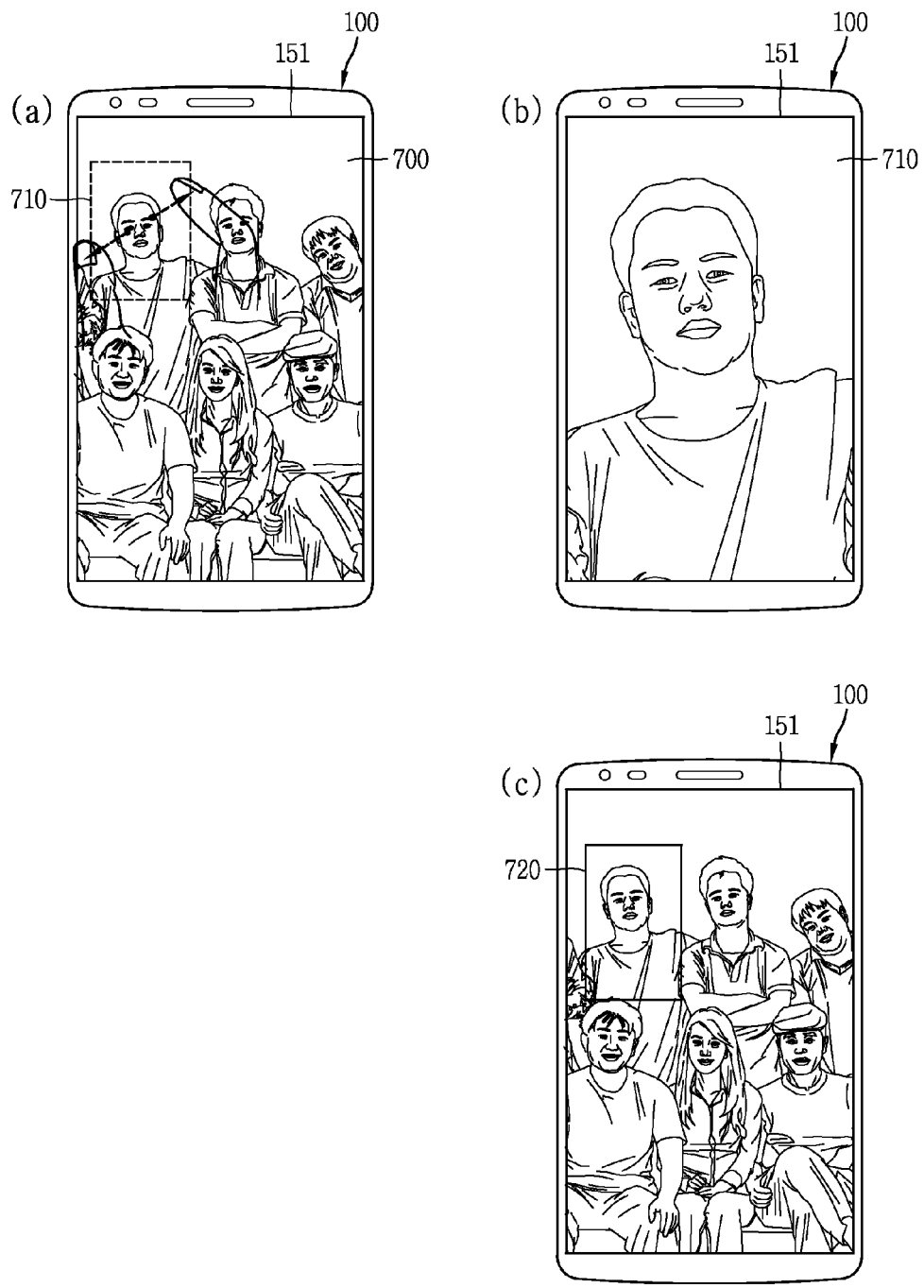
FIGS. 7A and 7B are conceptual views for explaining zoom-in information according to an embodiment of the present disclosure.
Figure 7B:
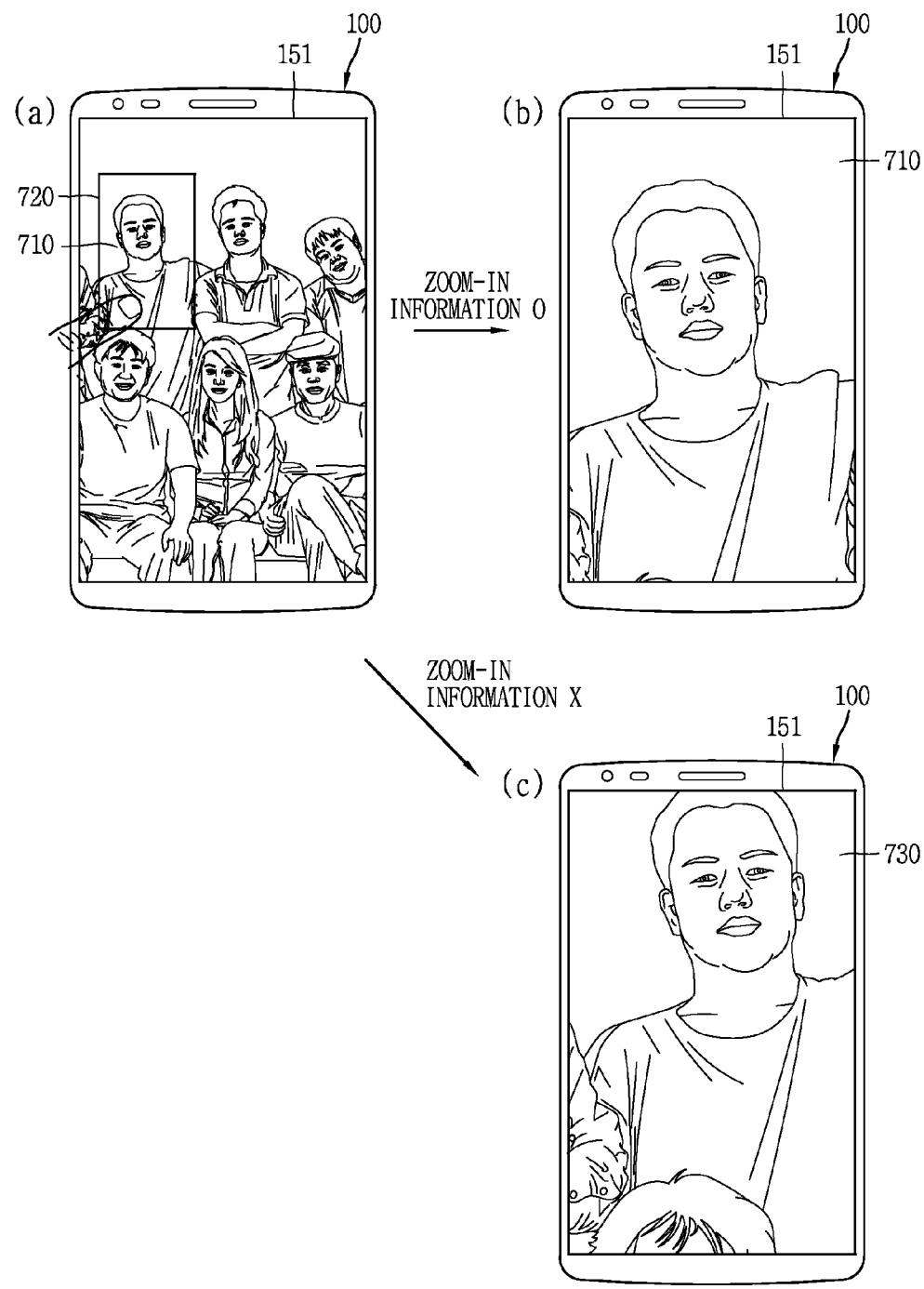

FIGS. 7A and 7B are conceptual views for explaining zoom-in information according to an embodiment of the present disclosure.

As illustrated in FIG. 7A(a), the whole of one image 700 may be displayed on the touch screen 151. In this state, when a predetermined type of touch (for example, pinch-out touch) is applied, the controller 180 may display part 710 of the one image 700 in an enlarged manner on the touch screen 151 as illustrated in FIG. 7A(b).

In this state, the controller 180 may zoom-in information 720 corresponding to part 710 of the one image 700 to be linked to the one image 700 based on satisfying a predetermined condition.

The zoom-in information 720 may denote information associated with a region (part) displayed in an enlarged manner on one image. Specifically, the zoom-in information 720 may include information associated with the location and size of the part 710 of the one image 700 displayed in an enlarged manner (or information on the location and size of the part 710). In other words, the zoom-in information 720 may be information for memorizing part (region) that has been displayed in an enlarged manner on one image.

There may be various predetermined conditions for linking zoom-in information. For an example, the predetermined condition may include maintaining part 710 of the one image 700 displayed in an enlarged manner for a predetermined period of time, applying a predetermined type of touch (for example, long touch) to part 710 of the one image 700 displayed in an enlarged manner, applying a touch (for example, pinch-out touch, pinch-in touch) for enlarging and reducing the one image 700 more than a predetermined number of times, applying a drag touch for moving the enlarged part of the one image 700 more than a predetermined number of times, applying a touch to an icon linked to a function of linking zoom-in information, and the like.

Here, when the predetermined condition is applying a touch (for example, pinch-out touch, pinch-in touch) for enlarging and reducing the one image 700 more than a predetermined number of times or applying a drag touch for moving the enlarged part of the one image 700 more than a predetermined number of times, the controller 180 may generate zoom-in information to correspond to the most lately enlarged and displayed part of the one image 700.

For example, when a state of displaying part 710 of the one image 700 in an enlarged manner is maintained for a predetermined period of time, the controller 180 may generate zoom-in information 720 corresponding to the part 710. Here, maintaining the state of displaying part 710 of the one image 700 in an enlarged manner for a predetermined period of time may denote displaying part 710 of the one image 700 in an enlarged manner and then not applying a user control command (for example, touch) for the predetermined period of time.

Then, the controller 180 may link the zoom-in information 720 to the one image 700.

The zoom-in information 720 may be displayed on the touch screen 151 as illustrated in FIG. 7A(c). However, the present disclosure may not be necessarily limited to this, and the zoom-in information 720 may not be displayed on the touch screen 151. When the zoom-in information 720 is not displayed thereon, an indicator indicating that the zoom-in information 720 is linked to the one image 700 may be displayed on the touch screen 151.

Furthermore, the zoom-in information 720 may be formed to be displayed when a predetermined type of touch (for example, short touch) is applied to the touch screen 151 in a non-display state.

The controller 180 of the mobile terminal associated with the present disclosure may enlarge the one image 700 in a different manner according to whether or not zoom-in information 720 is linked to one image 700.

For example, when zoom-in information 720 is linked to one image 700 as illustrated in FIG. 7B(a), the controller 180 may display part 710 (region) of the one image 700 corresponding to the zoom-in information 720 in an enlarged manner on the touch screen 151 based on a predetermined type of touch (for example, double touch) applied to the one image 700 (or touch screen 151) as illustrated in FIG. 7B(b). Here, the 180 may display part 710 of the one image 700 corresponding to the zoom-in information 720 in an enlarged manner regardless of a position to which the predetermined type of touch is applied.

For another example, in case where zoom-in information 720 is not linked to one image 700, when a predetermined type of touch (for example, double touch) is applied to the one image 700 as illustrated in FIG. 7B(c), the controller 180 may display part having a predetermined size (certain size) in an enlarged manner on the touch screen 151 around a position to which the predetermined type of touch is applied. In other words, in case where zoom-in information 720 is not linked thereto, enlarged part of the one image may vary according to a position to which a predetermined type of touch is applied. In other words, in case where zoom-in information 720 is not linked to one image 700, the controller 180 may display a different portion of the one image 700 in an enlarged manner based on a position to which a predetermined type of touch is applied.

Through the foregoing configuration, the present disclosure may provide a user interface capable of more easily re-enlarging part that has been displayed in an enlarged manner by storing zoom-in information to one image.

On the other hand, according to the present disclosure, it may be possible to display an image stored in a mobile terminal through an external terminal. Here, in case where zoom-in information is linked to an image desired to be displayed on an external terminal, the present disclosure may display the image in various ways.

The external terminal described in the present specification may include a wearable device (for example, watch-type terminal (smartwatch), a glasses-type terminal (smart glasses), a head mounted display (HMD), and the like. According to the present specification, a case where the external terminal is a watch-type terminal will be described as an example.

The external terminal may include at least one of constituent elements described in FIG. 1A. Furthermore, the mobile terminal 100 and the external terminal 200 may transmit and receive data to and from each other through the wireless communication unit 110, for an example.

Hereinafter, reference numeral 280 for the controller provided in the external terminal 200, and reference numeral 251 for the touch screen provided in the external terminal 200 will be given. The description of the controller 180 of the mobile terminal 100 and the touch screen 151 of the mobile terminal 100 illustrated in FIG. 1A will be analogically applied to the controller 280 of the external terminal 200 and the touch screen 251 of the external terminal 200 in the same/similar manner.

For example, the mobile terminal 100 may be connected to the external terminal 200 to enable wireless communication through the wireless communication unit 110. In this case, the external terminal 200 may display event information occurring on the mobile terminal 100, an image stored in the mobile terminal 100 or the like on the touch screen 251 of the external terminal 200.

Various operations (functions) carried out on the external terminal 200 may be controlled by the controller 280 of the external terminal 200 or controlled by the controller 180 of the mobile terminal 100.

The description illustrated in FIGS. 2 through 7B will be also analogically applied to the external terminal 200 in the same or similar manner. Furthermore, the description illustrated for the external terminal will be analogically applied to the mobile terminal in the same or similar manner.

Figure 8A:
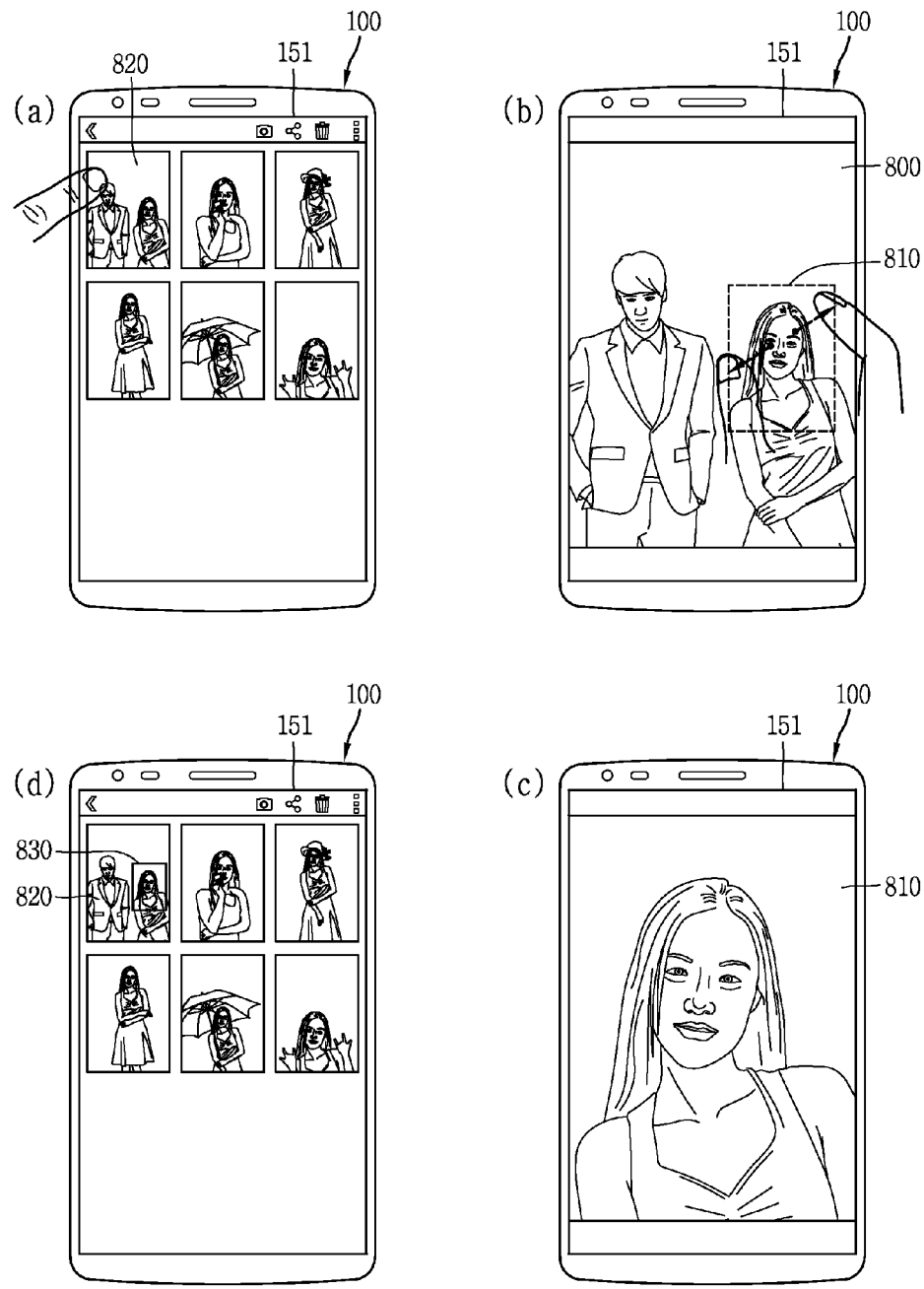
FIGS. 8A and 8B are conceptual views for explaining a method of displaying an image linked to zoom-in information from an external terminal.
Figure 8B:
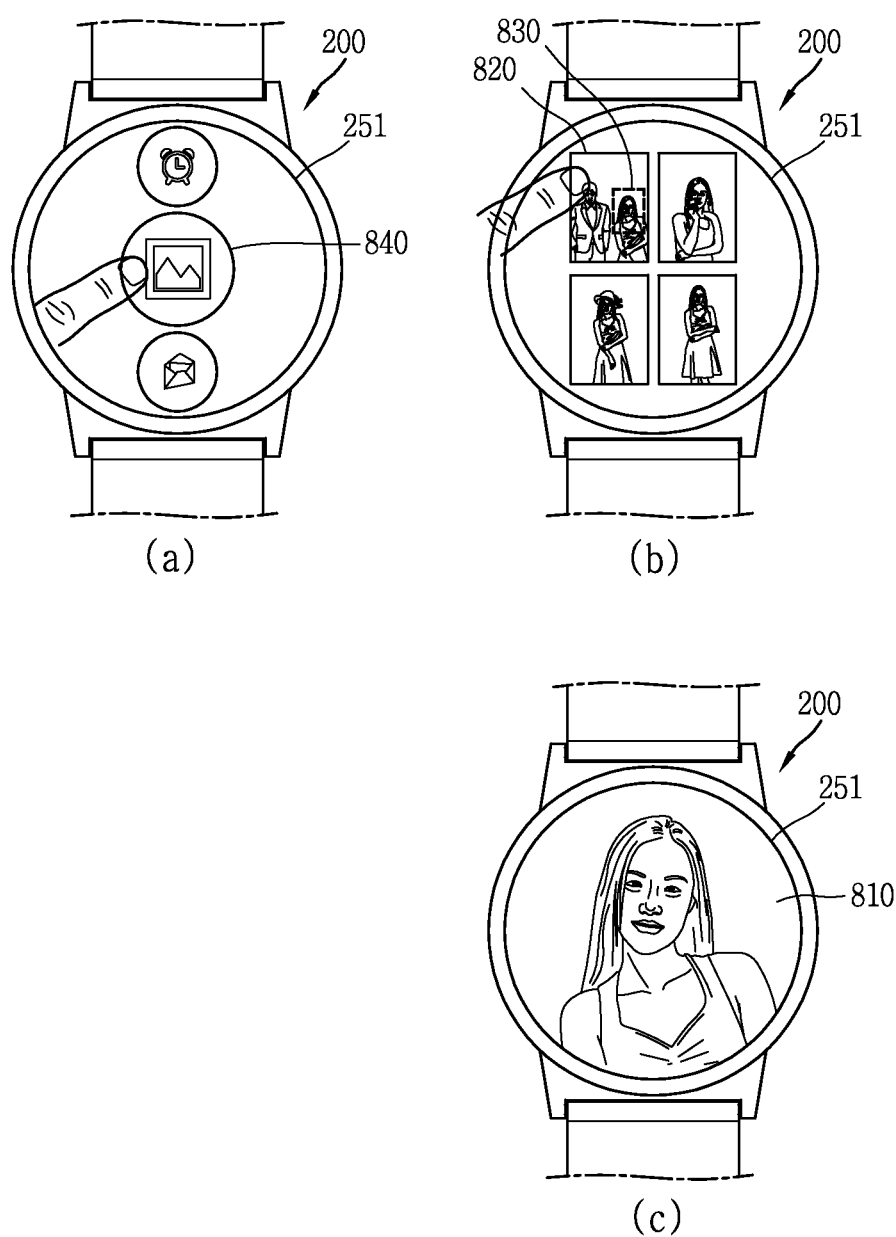

FIGS. 8A and 8B are conceptual views for explaining a method of displaying an image linked to zoom-in information from an external terminal.

First, a method of linking zoom-in information to one image will be described with reference to FIG. 8A.

As illustrated in FIG. 8A(a), a plurality of thumbnails corresponding to a plurality of images stored in the memory 170 may be displayed on the touch screen 151.

When any one thumbnail 820 of a plurality of thumbnails is selected, the controller 180 may display the whole of one image 800 corresponding to the thumbnail 820 on the touch screen 151 as illustrated in FIG. 8A(b).

In this state, when a predetermined type of touch (for example, pinch-out touch) is applied to the one image 800, the controller 180 may display part 810 of the one image 800 in an enlarged manner on the touch screen 151 as illustrated in FIG. 8A(c).

Here, the controller 180 may maintain a state in which generate zoom-in information 820 corresponding to part 810 of the one image 800 based on satisfying a predetermined condition (for example, based on maintaining a state in which the part 810 is displayed in an enlarged manner for a predetermined period of time or selecting a graphic object linked to a function of linking (storing, specifying) zoom-in information. Then, as illustrated in FIG. 8A(d), the controller 180 may link the generated zoom-in information 820 to the one image 800.

As illustrated in FIG. 8B(a), an icon 840 linked to a function of displaying an image stored in the memory 170 of the mobile terminal 100 may be displayed on the touch screen 251 of the external terminal 200 associated with the present disclosure.

When the icon 840 is selected, as illustrated in FIG. 8B(b), the controller 180 of the mobile terminal 100 (or the controller 280 of the external terminal 200) may display a plurality of thumbnails corresponding to a plurality of images stored in the memory 170 of the mobile terminal 100 on the touch screen 251 of the external terminal 200 through the wireless communication unit (communication unit).

Here, when there is a display request of one image linked to zoom-in information 830 on the external terminal 200 as illustrated in FIG. 8B(b) (or a thumbnail 820 corresponding to one image 800 linked to zoom-in information 830 is selected from a plurality of thumbnails displayed on the touch screen 251 of the external terminal 200), the controller 180 may immediately display part 810 of the one image 800 corresponding to the zoom-in information 820 in an enlarged manner as illustrated in FIG. 8B(c).

In other words, when zoom-in information is linked to one image corresponding to a thumbnail selected on the external terminal 200, the controller 180 of the mobile terminal 100 (or the controller 280 of the external terminal 200) may display a part of the one image corresponding to the zoom-in information in an enlarged manner on the touch screen 251 of the external terminal without displaying the whole of the one image on the touch screen 251 of the external terminal.

The foregoing description will be analogically applied to the mobile terminal in the same or similar manner. For example, as illustrated in FIG. 8A(d), when a thumbnail 820 corresponding to one image linked to zoom-in information 820 is selected from a plurality of thumbnails displayed on the touch screen 151 in the mobile terminal 100, the controller 180 may immediately display part 810 of the one image corresponding to the zoom-in information 820 in an enlarged manner on the touch screen 151 without displaying the whole of the one image.

Through the foregoing configuration, it may be possible to provide a control method capable of immediately displaying a region that has been previously displayed in an enlarged manner without performing an additional enlargement operation when an image that has been previously displayed in an enlarged manner (an image linked to zoom-in information) is displayed through the external terminal or redisplayed through the mobile terminal.

On the other hand, the present disclosure may link a plurality of zoom-in information to one image. Hereinafter, a control method in case where a plurality of zoom-in information to one image will be described in more detail with reference to the accompanying drawings.

Figure 9A:
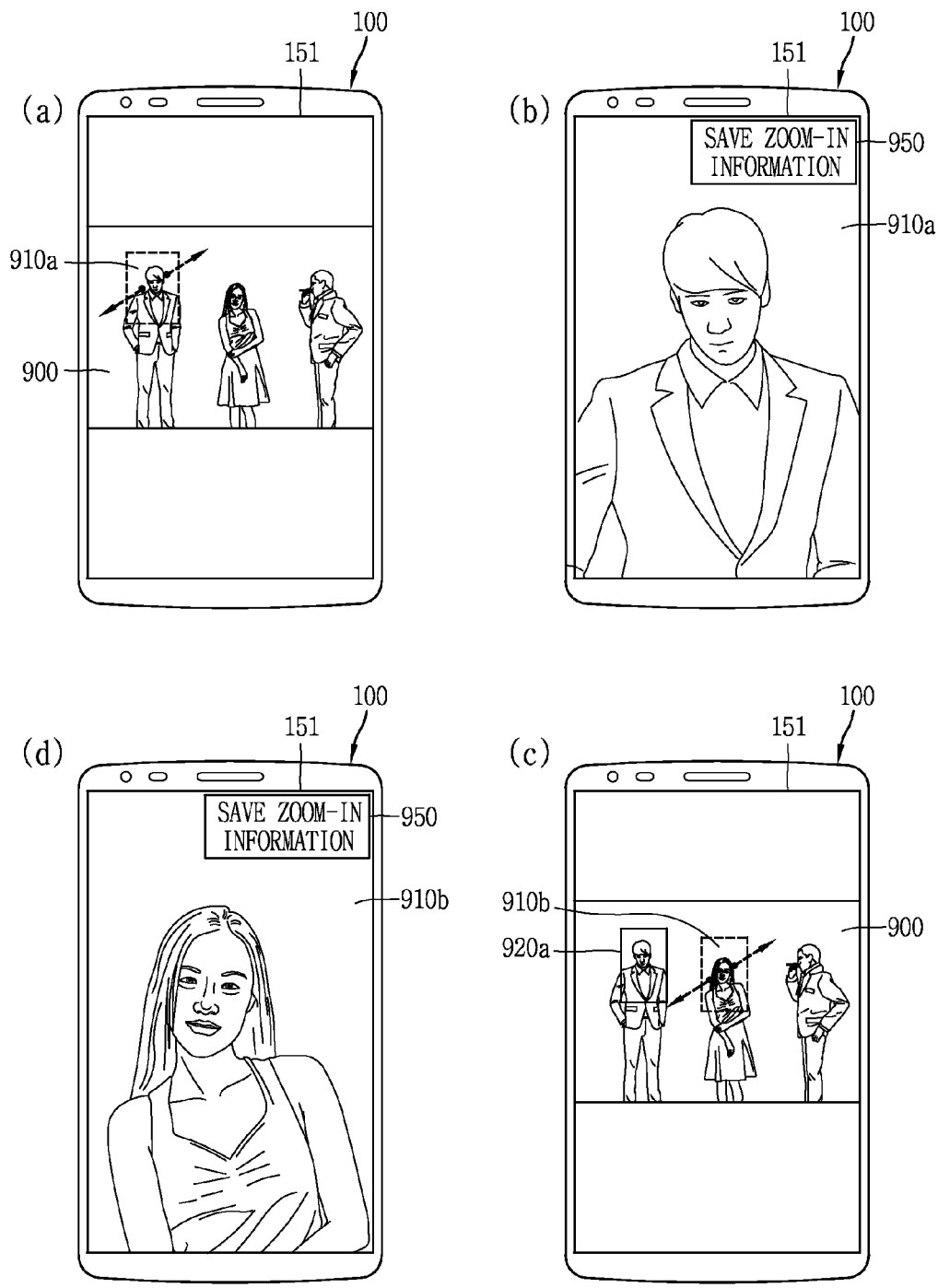
FIGS. 9A, 9B, 9C, 9D and 9E are conceptual views for explaining a control method in case where a plurality of zoom-in information are linked to one image.

FIGS. 9A, 9B, 9C, 9D and 9E are conceptual views for explaining a control method in case where a plurality of zoom-in information are linked to one image. Referring to FIG. 9A, the present disclosure may link a plurality of zoom-in information to one image 900 in various ways.

For example, when a predetermined type of touch (for example, pinch-out touch) is applied to one image 900 displayed on the touch screen 151 as illustrated in FIG. 9A(a), the controller 180 may display part 910a of the one image 900 in an enlarged manner on the touch screen 151 based on a position to which the predetermined type of touch is applied and the extent of applying the predetermined type of touch as illustrated in FIG. 9A(b).

At this time, as illustrated in FIG. 9A(b), the controller 180 may display a graphic object 950 linked to a function of linking zoom-in information corresponding to part 910a of the one image 900 displayed in an enlarged manner on the touch screen 151. The graphic object 950 may be displayed based on displaying the part 910a of the one image 900 in an enlarged manner or maintaining a state of the part 910a being displayed in an enlarged manner for a predetermined period of time or applying a predetermined type of touch (for example, short touch) to the part 910a displayed in an enlarged manner, for an example.

When the graphic object 950 is selected (or touched), the controller 180 may link zoom-in information 920*a* corresponding to the part 910*a* to the one image 900 as illustrated in FIG. 9A. At this time, when the graphic object 950 is selected, the controller 180 may display the whole of the one image 900 instead of the part 910*a* displayed in an enlarged manner on the touch screen 151. In this case, the graphic object 950 may disappear from the touch screen 151.

The present disclosure may not be necessarily limited to this, and the controller 180 may maintain the display the enlarged part 910*a* even though the graphic object 950 is selected.

When a predetermined type of touch (for example, pinch-out touch) is applied to one image 900 in a state that any one zoom-in information 920*a* is linked thereto, the controller 180 may display new part 910*b* of the one image 900 in an enlarged manner on the touch screen 151 based on the location and extent at which the touch is applied as illustrated in FIG. 9A(d).

Similarly, in this case, the graphic object 950 may be displayed on the touch screen 151. When the graphic object 950 is selected (touched), the controller 180 may additionally link zoom-in information corresponding to the new part 910*b* to the one image 900.

However, the present disclosure may not be necessarily limited to this, as illustrated in FIG. 9A(b), and when the graphic object 950 is selected in a state that the part 910*a* of the one image 900 is displayed in an enlarged manner, zoom-in information 920*a* corresponding to the part 910*a* may be linked to the one image 900. Then, when a drag touch is applied to the enlarged part 910*a* (or touch screen 151) in case where the display of the enlarged part 910*a* is maintained, part 910*b* different from the part 910*a* may be displayed on the touch screen 151. In other words, the controller 180 may move the enlarged one image 900 based on the drag touch.

Due to this, part 910*b* different from the part 910*a* of the one image is displayed in an enlarged manner on the touch screen 151. At this time, the display of the graphic object 950 may be maintained even though a drag touch is applied thereto.

When the graphic object 950 is selected (or touched) in a state that the different part 910*b* is displayed on the touch screen 151, the controller 180 may additionally link zoom-in information corresponding to the different part 910*b* to the one image 900.

Figure 9B:
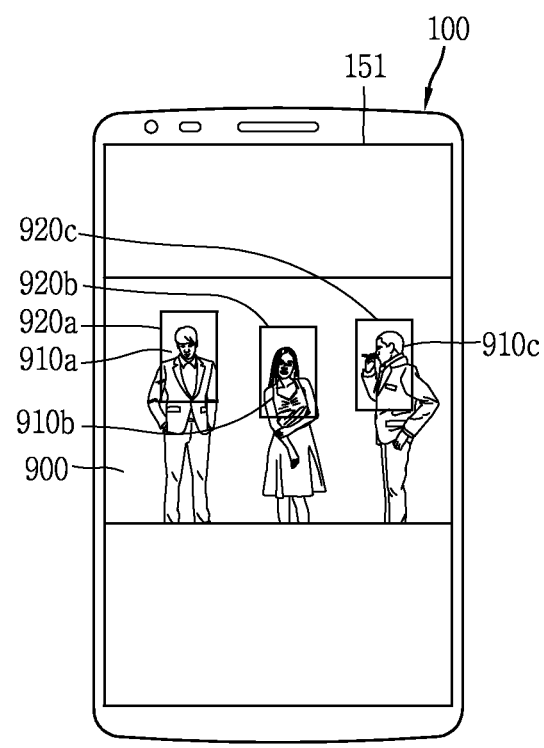

Through the foregoing method, the present disclosure may link a plurality of zoom-in information to one image. Hereinafter, as illustrated in FIG. 9B, a case where three zoom-in information 920*a*, 920*b*, 920*c* are linked to one image 900 will be described as an example.

The sizes of parts corresponding to the plurality of zoom-in information may be all the same or at least one thereof may be different.

When there is a display request for one image linked to a plurality of zoom-in information (for example, a thumbnail of one image is selected), the controller 180 may display the one image on the touch screen 151 in various ways.

For example, when there is a display request for one image linked to a plurality of zoom-in information, the controller 180 may display the whole of the one image 900 on the touch screen 151.

For another example, when there is a display request for one image linked to a plurality of zoom-in information, the controller 180 may immediately display a part corresponding to any one of the plurality of zoom-in information in an enlarged manner on the touch screen 151.

Here, the any one zoom-in information may be determined by a predetermined method. For example, the controller 180 may determine any one of zoom-in information which is most lately linked thereto among a plurality of zoom-in information, zoom-in information for which the size of a part corresponding to the zoom-in information is the largest or the smallest, and zoom-in information determined based on a location linked to zoom-in information (for example, zoom-in information linked to the most left, zoom-in information linked to the most right or zoom-in information linked to the middle) as the any one zoom-in information.

First, a case where the whole of the one image 900 linked to a plurality of zoom-in information is displayed on the touch screen 151 will be described.

When a touch (predetermined type of touch, for example, double touch) linked to a zoom-in function is applied to one image 900 in a state that a plurality of zoom-in information 920*a*, 920*b*, 920*c* are linked to the one image 900, the controller 180 may display the nearest part to a position to which the touch is applied in an enlarged manner among a plurality of parts 910*a*, 910*b*, 910*c* corresponding to the plurality of zoom-in information 920*a*, 920*b*, 920*c*.

Figure 9C:
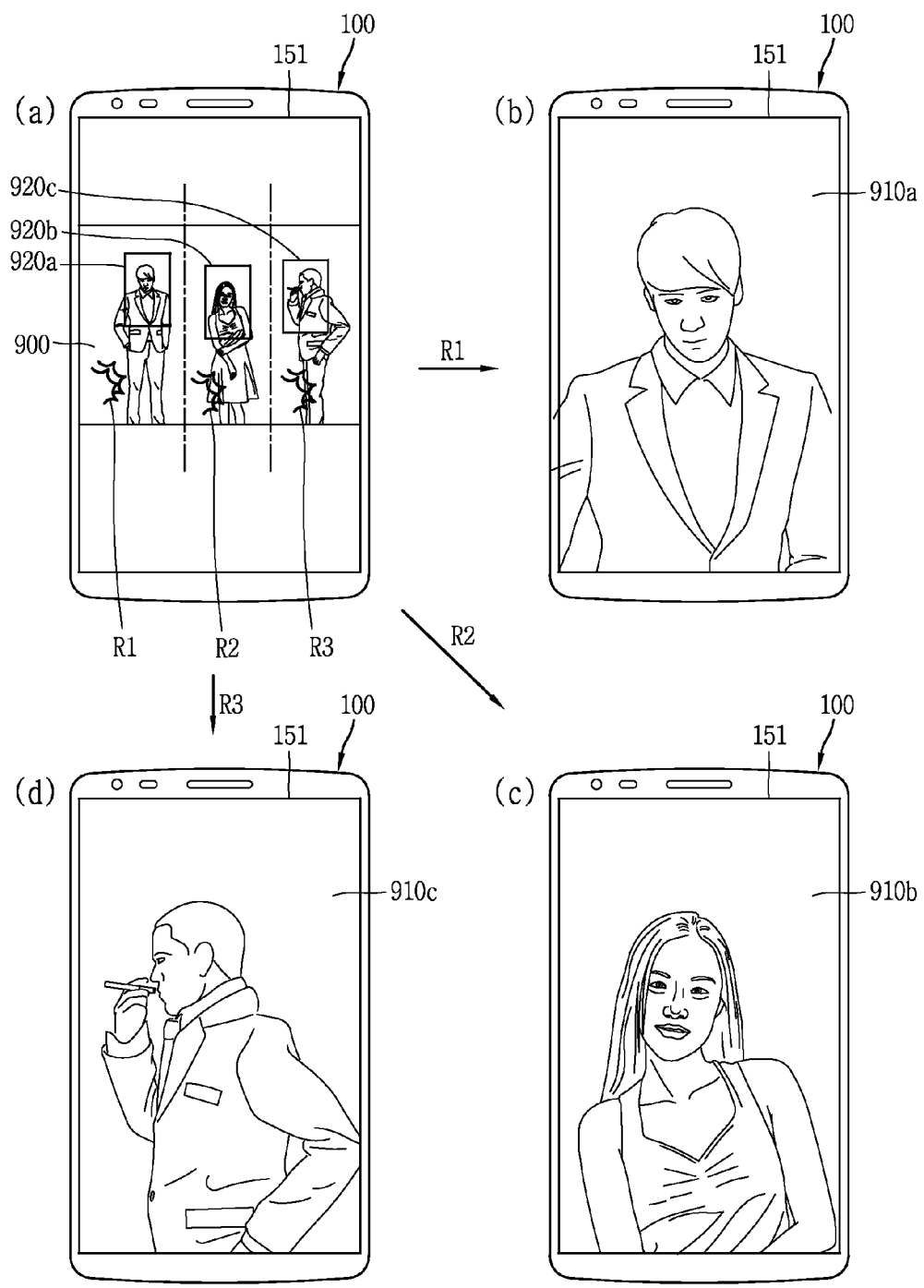

When a predetermined type of touch is applied to position R1 of one image 900 in a state that the plurality of zoom-in information 920*a*, 920*b*, 920*c* are linked to the one image 900 as illustrated in FIG. 9C(a), the controller 180 may display the nearest part 910*a* to position R1 to which the touch is applied in an enlarged manner on the touch screen 151 among the plurality of parts 910*a*, 910*b*, 910*c* corresponding to the plurality of zoom-in information 920*a*, 920*b*, 920*c* as illustrated in FIG. 9C(b).

Furthermore, when the predetermined type of touch is applied to position R2, the controller 180 may display the nearest part 910*b* to the position R2 on the touch screen 151 as illustrated in FIG. 9C(c).

Similarly, when the predetermined type of touch is applied to position R3, the controller 180 may display part 910*c* corresponding to the nearest zoom-in information 920*c* to the position R3 among the plurality of zoom-in information 920*a*, 920*b*, 920*c* on the touch screen 151 as illustrated in FIG. 9C(d).

Through the foregoing configuration, the present disclosure may provide a user interface capable of displaying user's desired any one part in en enlarged manner in an optimal method among a plurality of parts when he or she wants to view one image, parts of which have been previously viewed in an enlarged manner, in an enlarged manner again.

Hereinafter, a case where any one of a plurality of parts corresponding to a plurality of zoom-in information is displayed in an enlarged manner on one image 900 linked to the plurality of zoom-in information will be described.

As described above, when there is a display request for one image linked to a plurality of zoom-in information, the controller 180 may immediately display a part corresponding to any one of the plurality of zoom-in information in an enlarged manner on the touch screen 151. Furthermore, the controller 180 may display a part corresponding to any one of a plurality of zoom-in information in an enlarged manner on the touch screen 151 based on a predetermined type of touch applied in a state that the whole of one image linked to the plurality of zoom-in information is displayed on the touch screen 151.

Figure 9D:
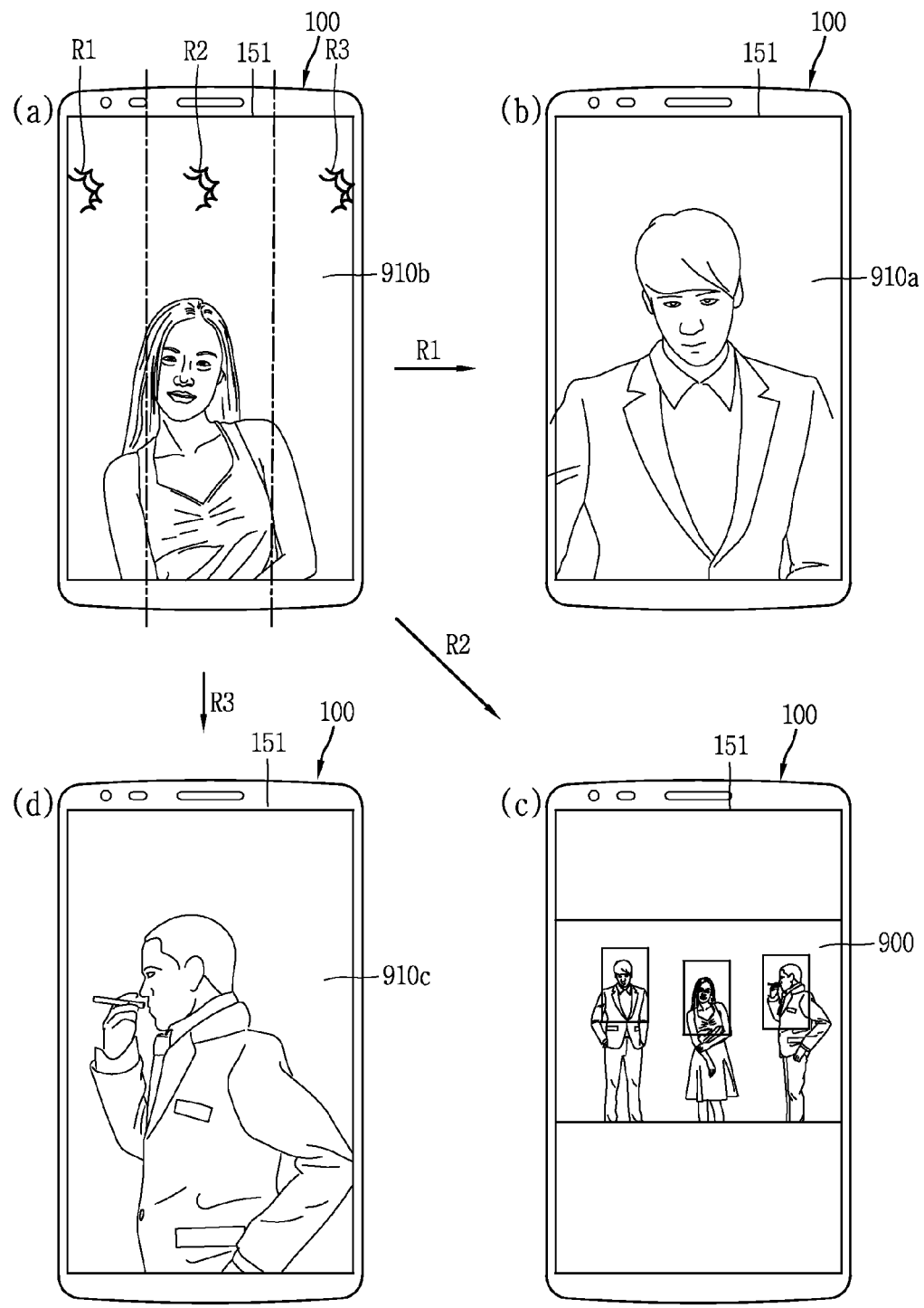

As illustrated in FIG. 9D(a), part 910*b* corresponding to any one zoom-in information 920*b* among a plurality of zoom-in information 920a, 920b, 920c linked to one image 900 (first image) may be displayed in an enlarged manner on the touch screen 151.

When the predetermined type of touch is applied in a state that a part 910b corresponding to any one zoom-in information 920b of a plurality of zoom-in information 920a, 920b, 920c linked to one image 900 is displayed in an enlarged manner, the controller 180 may perform a different operation according to a region to which the predetermined type of touch is applied.

Specifically, when the predetermined type of touch (for example, double touch) is applied to a first region (for example, R1 or R3) included in the touch screen 151, the controller 180 may display a part 910a or 910c corresponding to zoom-in information 920a or 920c different from the any one zoom-in information 920b on the touch screen.

Furthermore, when the predetermined type of touch is applied to a second region (for example, R2) different from the first region, the controller 180 may display the whole of the one image 900 on the touch screen 151.

For example, referring to FIGS. 9B and 9D, when a predetermined type of touch is applied to a first region (for example, the most left one (R1) of three regions into which the touch screen is divided in a length direction thereof) in a state that a part 910b corresponding to any one zoom-in information 920b of a plurality of zoom-in information 920a, 920b, 920c is enlarged, the controller 180 may display a part 910a corresponding to zoom-in information 920a different from the any one zoom-in information 920b in an enlarged manner on the touch screen 151.

Here, a part corresponding to the different zoom-in information may be determined based on the location of the first region (i.e., a position to which a predetermined type of touch is applied).

For example, when the first region is the most left one (R1) of three regions into which the touch screen is divided in a length direction thereof, the controller 180 may determine zoom-in information 920a linked to the left based on the any one zoom-in information 920b as the different zoom-in information as illustrated in FIG. 9D(b). In this case, the controller 180 may display a part 910a corresponding to zoom-in information 920a linked to the left based on the any one zoom-in information 920b in an enlarged manner based on a predetermined type of touch applied to the most left region (R1).

On the other hand, when the first region is the most right one (R3) of three regions into which the touch screen is divided in a length direction thereof, the controller 180 may determine zoom-in information 920c linked to the right based on the any one zoom-in information 920b as the different zoom-in information as illustrated in FIG. 9D(d).

For example, when the predetermined type of touch is applied to the most right one (R3) of three regions into which the touch screen is divided in a length direction thereof, the controller 180 may display a part 910c corresponding to zoom-in information 920c linked to (located at) the right based on the any one zoom-in information 920b in an enlarged manner based on a predetermined type of touch applied to the most left region (R1) as illustrated in FIG. 9D(d). Though not shown in the drawing, when the predetermined type of touch is applied to a first region (for example, the most left one (R1) of three regions into which the touch screen is divided in a length direction thereof) in a state that a part 910a corresponding to zoom-in information 920a linked to the most left is enlarged on the touch screen 151, the controller 180 may display a second image different from the first image 900 on the touch screen. The second image may be an image captured (stored) later than the first image, for an example.

At this time, when the first image and the second image are images satisfying a predetermined condition, the controller 180 may immediately display a part of the second image in an enlarged manner on the touch screen. A part of the second image may be a part having the location and size corresponding to those of a part 910a corresponding to zoom-in information 920a linked to the most left of the first image.

In other words, when a predetermined type of touch is applied to a first region, if there exists no zoom-in information in a direction corresponding to the location of the first region, the controller 180 may display a second image different from the first image 900.

Similarly, when a predetermined type of touch is applied to a first region (or third region) (for example, the most right one (R3) of three regions into which the touch screen is divided in a length direction thereof) in a state that that a part 910c corresponding to zoom-in information 920c linked to the most right is displayed in an enlarged manner, the controller 180 may display a third image different from the first image 900 on the touch screen. The third image may be an image captured (stored) earlier than the first image, for an example.

At this time, when the first image and the third image are images satisfying a predetermined condition, the controller 180 may immediately display a part of the third image in an enlarged manner on the touch screen 151. A part of the third image may be a part having the location and size corresponding to those of a part 910c corresponding to zoom-in information 920c linked to the most right of the first image.

On the other hand, when the predetermined type of touch is applied to a second region (for example, a middle one R2 of three regions into which the touch screen is divided in a length direction thereof) different from the first region, the controller 180 may reduce the enlarged first image 900, and display the whole of the first image 900 on the touch screen 151 as illustrated in FIG. 9D(c).

In the above, a case where the predetermined type of touch is a double touch has been described as an example. Hereinafter, a case where the predetermined type of touch is a flick touch will be described as an example with reference to FIG. 9E.

Figure 9E:
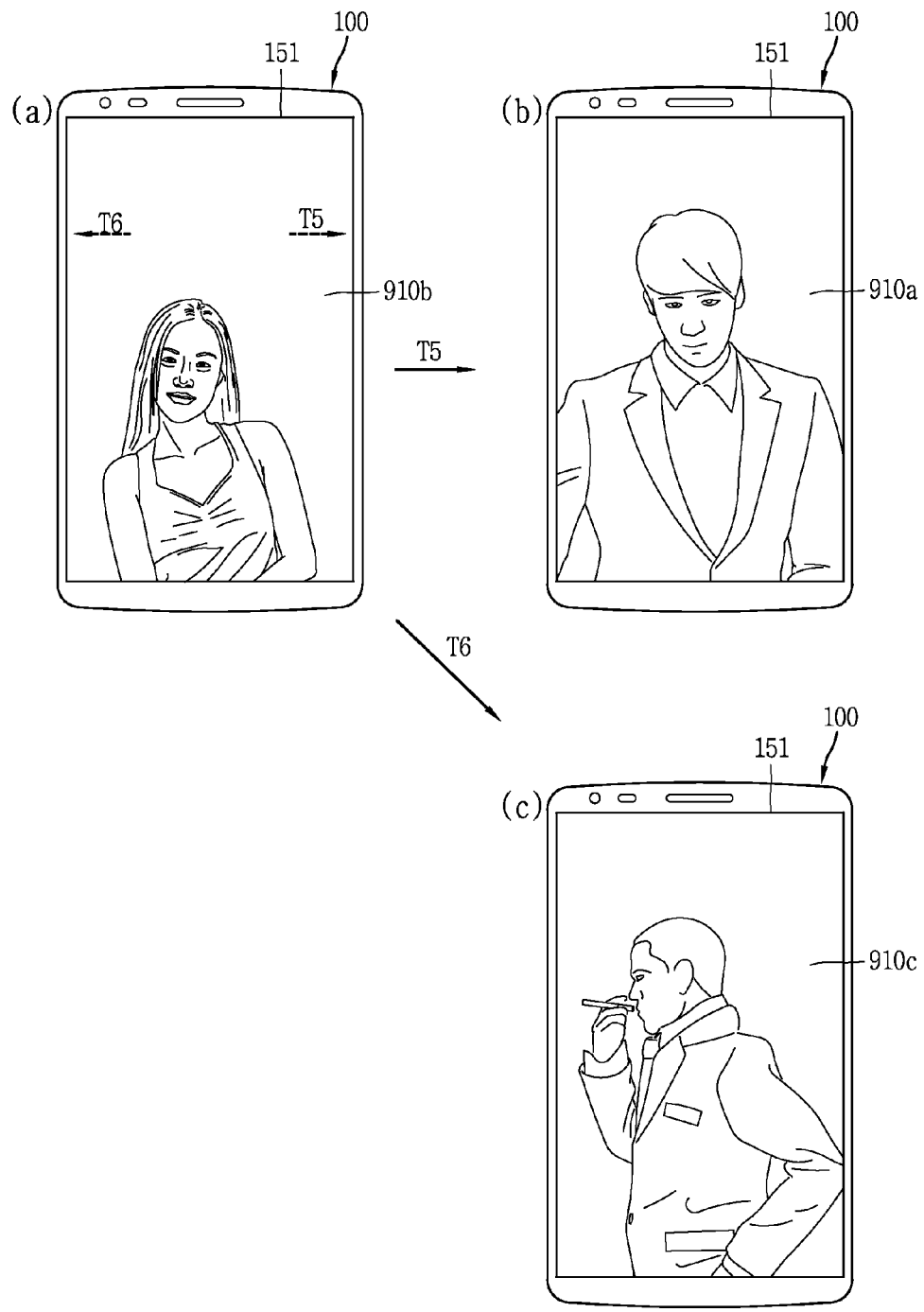

As illustrated in FIG. 9E(a), a part 910b corresponding to any one zoom-in information 920b of a plurality of zoom-in information 920a, 920b, 920c linked to one image 900 (first image) may be displayed in an enlarged manner on the touch screen 151.

Then, when the predetermined type of touch (for example, flick touch (T5, T6)) is applied in one direction in a state that a part 910b corresponding to any one zoom-in information 920b of a plurality of zoom-in information 920a, 920b, 920c linked to one image 900 is displayed in an enlarged manner, the controller 180 may display a part corresponding to zoom-in information located in a direction opposite to the one direction based on the any one zoom-in information.

Referring to FIGS. 9B and 9E, as illustrated in FIG. 9E(a), the predetermined type of touch (flick touch) (T5) may be applied to the touch screen 151 in one direction (for example, right direction) in a state that a part 910b corresponding to the any one zoom-in information 920b is displayed in an enlarged manner on the touch screen 151. In this case, as illustrated in FIG. 9E(b), the controller 180 may display a part 910a corresponding to zoom-in information 920a located in a direction (left direction) opposite to the one direction in an enlarged manner on the touch screen 151 based on the any one zoom-in information 920b.

When the predetermined type of touch (T6) is applied in one direction (for example, left direction), as illustrated in FIG. 9E(c), the controller 180 may display a part 910c corresponding to zoom-in information 920c located in a direction (right direction) opposite to the one direction in an enlarged manner on the touch screen 151 based on the any one zoom-in information 920b.

Furthermore, though not shown in the drawing, when a predetermined type of touch (for example, flick touch) is applied in a right direction in a state that a part 910a corresponding to zoom-in information 920a located at the most left of a plurality of zoom-in information is displayed in an enlarged manner on the touch screen, the controller 180 may display a second image different from the first image on the touch screen.

At this time, when the first image and the second image are images satisfying a predetermined condition, the controller 180 may immediately display a part of the second image in an enlarged manner on the touch screen 151. A part of the second image may be a part having the location and size corresponding to those of a part 910a corresponding to zoom-in information 920a linked to the most left of the first image. The second image may be an image captured (stored) later than the first image.

Similarly, when a predetermined type of touch (for example, flick touch) is applied in a left direction in a state that a part 910c corresponding to zoom-in information 920c located at the most right of a plurality of zoom-in information is displayed in an enlarged manner on the touch screen 151, the controller 180 may display a third image different from the second image on the touch screen.

At this time, when the first image and the third image are images satisfying a predetermined condition, the controller 180 may immediately display a part of the third image in an enlarged manner on the touch screen 151. A part of the third image may be a part having the location and size corresponding to those of a part 910c corresponding to zoom-in information 920c linked to the most right of the first image. The third image may be an image captured (stored) earlier than the first image.

In other words, when zoom-in information does not exist in a direction opposite to one direction to which a predetermined type of touch is applied based on the any one zoom-in information, the controller 180 may display an image different from the one image 900 on the touch screen 151.

When a drag touch other than a flick touch is applied in a state that a part corresponding to any one zoom-in information is displayed in an enlarged manner, the controller 180 may move one image 900. Due to this, a part and another part of the one image may be displayed in an enlarged manner on the touch screen 151.

Furthermore, the present disclosure may not be necessarily limited to a method of displaying a part corresponding to zoom-in information located in a direction opposite to one direction in an enlarged manner when a predetermined type of touch is applied in the one direction. In other words, it may be formed such that when the predetermined type of touch is applied in one direction in a state that a part corresponding to any one zoom-in information is displayed in an enlarged manner, the controller 180 may display a part corresponding to zoom-in information located in one direction based on the any one zoom-in information in an enlarged manner.

The description of FIGS. 9A through 9E may be also analogically applied to a case where an image is displayed on an external terminal in the same or similar manner.

Figure 10A:
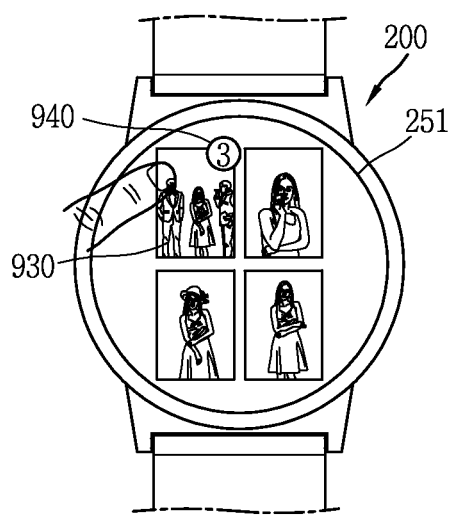
FIGS. 10A, 10B and 10C are conceptual views for explaining a control method in case where an image linked to a plurality of zoom-in information is displayed on an external terminal.
Figure 10B:
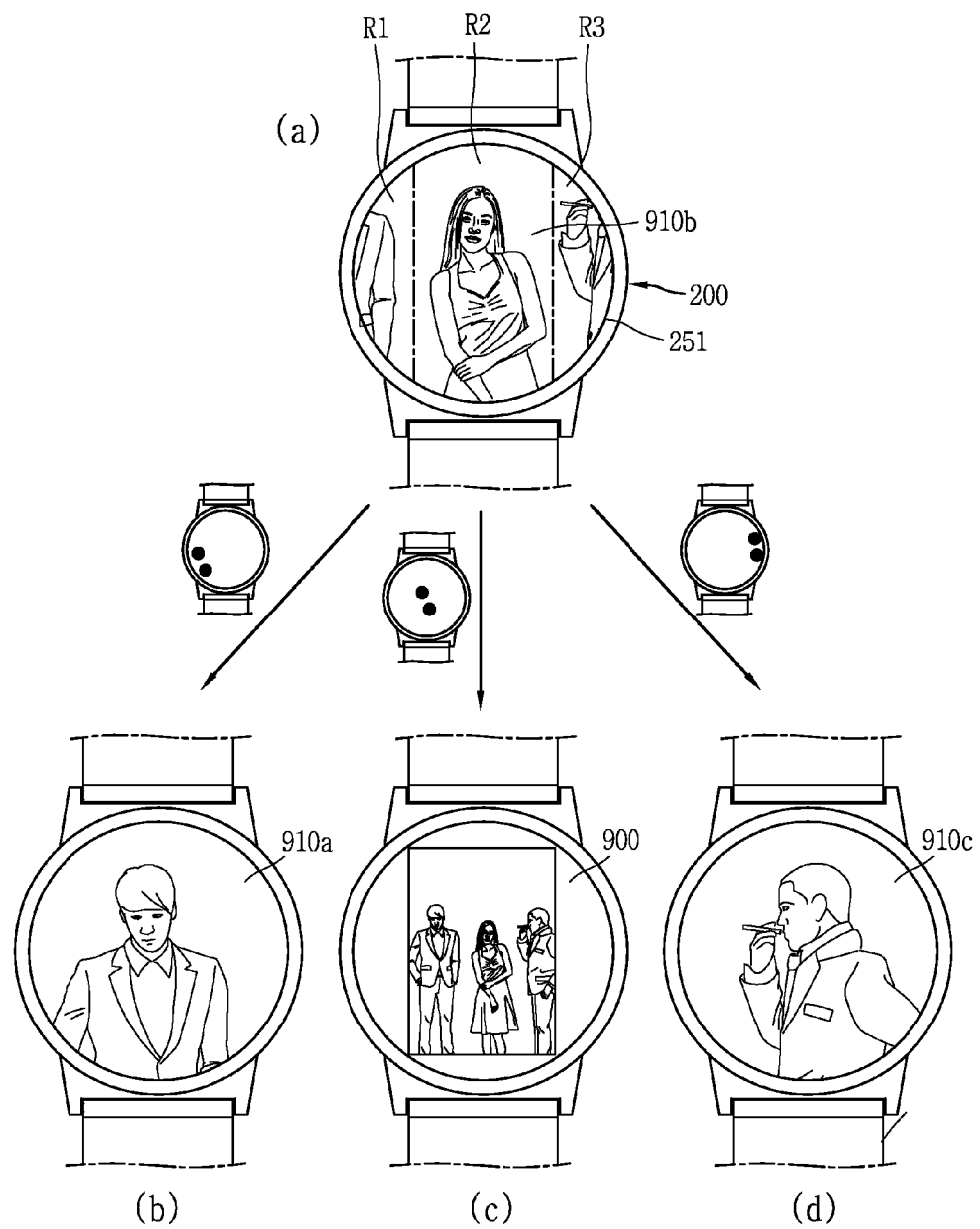
Figure 10C:
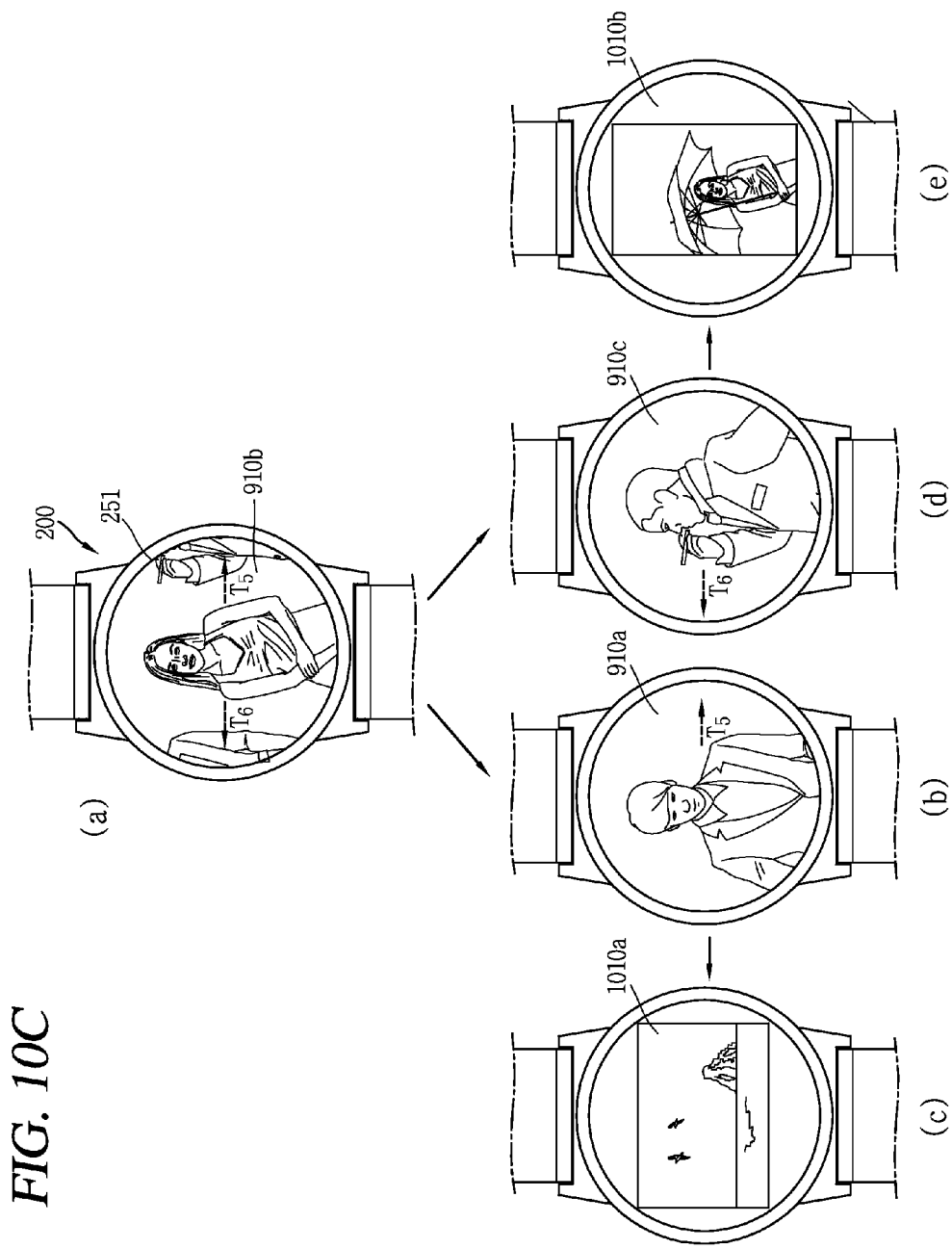

FIGS. 10A, 10B and 10C are conceptual views for explaining a control method in case where an image linked to a plurality of zoom-in information is displayed on an external terminal.

As illustrated in FIG. 10A, a plurality of thumbnails corresponding to a plurality of images stored in the memory 170 of the mobile terminal 100 may be displayed on the touch screen 251 of the external terminal 200 associated with the present disclosure.

It is assumed that a plurality of zoom-in information (three zoom-in information 920a, 920b, 920c) are linked to any one image 900 of the plurality of images as illustrated in FIG. 9B.

An indicator 940 indicating a number of zoom-in information linked one image may be displayed in an overlapping manner on a thumbnail 930 corresponding to the one image 900 linked to the plurality of zoom-in information.

When the thumbnail 930 is selected (or touched) on the touch screen 151 of the external terminal 200, the controller 180 of the mobile terminal (or the controller 280 of the external terminal) may display an image 900 corresponding to the thumbnail 930 on the touch screen 251 of the external terminal.

At this time, as illustrated in FIG. 10B(a), the controller 180 (or the controller 280 of the external terminal) may immediately display a part 910b corresponding to any one zoom-in information 920b of a plurality of zoom-in information 920a, 920b, 920c linked to the image 900 in an enlarged manner.

When there is a display request for one image linked to a plurality of zoom-in information, the controller 180 (or the controller 280 of the external terminal) may immediately a part corresponding to any one of the plurality of zoom-in information in an enlarged manner on the touch screen 251.

Here, the any one zoom-in information may be determined by a predetermined method. For an example, the controller 180 (or the controller 280 of the external terminal) may determine any one of zoom-in information which is most lately linked thereto among a plurality of zoom-in information, zoom-in information for which the size of a part corresponding to the zoom-in information is the largest or the smallest, and zoom-in information determined based on a location linked to zoom-in information (for example, zoom-in information linked to the most left, zoom-in information linked to the most right or zoom-in information linked to the middle) as the any one zoom-in information.

Furthermore, the controller 180 (or the controller 280 of the external terminal) may display a part corresponding to any one of a plurality of zoom-in information in an enlarged manner on the touch screen 251 of the external terminal based on a predetermined type of touch applied in a state that the whole of one image linked to the plurality of zoom-in information is displayed on the touch screen 151.

In this state, a predetermined type of touch (for example, double touch) may be applied to a first region (R1) of the touch screen 251 of the external terminal 200 (for example, the most left one of three regions into which the touch screen 251 is divided in a length direction thereof). In this case, as illustrated in FIG. 10B(b), the controller 180 (or the controller 280 of the external terminal) may display a part 910a corresponding to zoom-in information 920a located in a left direction based on the any one zoom-in information 920b in an enlarged manner on the touch screen 251 of the external terminal 200.

Similarly, a predetermined type of touch (for example, double touch) may be applied to a first region (or third region (R3)) of the touch screen 251 of the external terminal 200 (or the most right one of three regions into which the touch screen 251 is divided in a length direction thereof). In this case, the controller 180 (or the controller 280 of the external terminal) may immediately display a part 910c corresponding to zoom-in information 920c located in a right direction based on the any one zoom-in information 920b in an enlarged manner on the touch screen 251 of the external terminal 200 as illustrated in FIG. 10B(d).

Furthermore, a predetermined type of touch (for example, double touch) may be applied to a second region (R2) (for example, a middle one of three regions into which the touch screen 251 is divided in a length direction thereof) different from the first region in a state that a part 910b corresponding to the any one zoom-in information 920b is displayed in an enlarged manner. In this case, as illustrated in FIG. 10B(c), the controller 180 may reduce the enlarged one image 900, and display the whole of the one image 900 on the touch screen 251 of the external terminal 200.

Though not shown in the drawing, when the predetermined type of touch is applied to a first region (for example, the most left one (R1) of three regions into which the touch screen 251 is divided in a length direction thereof) in a state that a part 910a corresponding to zoom-in information 920a linked to the most left is enlarged on the touch screen 251 of the external terminal 200, the controller 180 (or the controller 280 of the external terminal) may display a second image different from the first image 900 on the touch screen 251 of the external terminal.

At this time, when the first image and the second image are images satisfying a predetermined condition, the controller 180 (or the controller 280 of the external terminal) may immediately display a part of the second image in an enlarged manner on the touch screen 251 of the external terminal. A part of the second image may be a part having the location and size corresponding to those of a part 910a corresponding to zoom-in information 920a linked to the most left of the first image.

In other words, when a predetermined type of touch is applied to a first region, if there exists no zoom-in information in a direction corresponding to the location of the first region, the controller 180 (or the controller 280 of the external terminal) may display a second image different from the first image 900.

Similarly, when a predetermined type of touch is applied to a first region (or third region) (for example, the most right one (R3) of three regions into which the touch screen is divided in a length direction thereof) in a state that that a part 910c corresponding to zoom-in information 920c linked to the most right is displayed in an enlarged manner on the touch screen 251 of the external terminal 200, the controller 180 (or the controller 280 of the external terminal) may display a third image different from the first image 900 on the touch screen 251 of the external terminal.

At this time, when the first image and the third image are images satisfying a predetermined condition, the controller 180 may immediately display a part of the third image in an enlarged manner on the touch screen 151. A part of the third image may be a part having the location and size corresponding to those of a part 910c corresponding to zoom-in information 920c linked to the most right of the first image.

Similarly to the description of FIG. 9E, when the predetermined type of touch is a flick touch, the controller 180 (or the controller 280 of the external terminal) may perform a different operation according to a direction to which the flick touch is applied.

Hereinafter, a case where the predetermined type of touch is a flick touch will be described as an example.

As illustrated in FIG. 10C(a), a part 910b corresponding to any one zoom-in information 920b of a plurality of zoom-in information 920a, 920b, 920c linked to one image 900 (first image) stored in the memory 170 of the mobile terminal 100 may be displayed in an enlarged manner on the touch screen 251 of the external terminal.

Then, when the predetermined type of touch (for example, flick touch (T5, T6)) is applied in one direction in a state that a part 910b corresponding to any one zoom-in information 920b of a plurality of zoom-in information 920a, 920b, 920c linked to one image 900 is displayed in an enlarged manner, the controller 180 (or the controller 280 of the external terminal) may display a part corresponding to zoom-in information located in a direction opposite to the one direction based on the any one zoom-in information.

Referring to FIGS. 9B and 10C, as illustrated in FIG. 10C(a), the predetermined type of touch (flick touch) (T5) may be applied to the touch screen 251 of the external terminal in one direction (for example, right direction) in a state that a part 910b corresponding to the any one zoom-in information 920b is displayed in an enlarged manner on the touch screen 151. In this case, as illustrated in FIG. 10C(b), the controller 180 (or the controller 280 of the external terminal) may display a part 910a corresponding to zoom-in information 920a located in a direction (left direction) opposite to the one direction in an enlarged manner on the touch screen 251 of the external terminal based on the any one zoom-in information 920b.

When a predetermined type of touch (for example, flick touch) (T5) is applied in a right direction in a state that a part 910a corresponding to zoom-in information 920a located at the most lest of a plurality of zoom-in information is displayed in an enlarged manner on the touch screen 251 of the external terminal as illustrated in FIG. 10C(b), the controller 180 (or the controller 280 of the external terminal) may display a second image 1010a different from the first image 900 on the touch screen as illustrated in FIG. 10C(c).

At this time, when the first image 900 and the second image 1010a are images satisfying a predetermined condition, the controller 180 (or the controller 280 of the external terminal) may immediately display a part of the second image 1010a on the touch screen 151. However, the first image and the second image are not images satisfying a predetermined condition, as illustrated in FIG. 10C(c), the controller 180 (or the controller 280 of the external terminal) may display the whole of the second image 1010a on the touch screen 251 of the external terminal.

When the predetermined type of touch (T6) is applied in one direction (for example, left direction) as illustrated in FIG. 10C(a), the controller 180 (or the controller 280 of the external terminal) may display a part 910c corresponding to zoom-in information 920c located in a direction (right direction) opposite to the one direction based on the any one zoom-in information 920b in an enlarged manner on the touch screen 251 of the external terminal.

Similarly, as illustrated in FIG. 10C(d), when a predetermined type of touch (for example, flick touch) (T6) is applied in a left direction in a state that a part 910c corresponding to zoom-in information 920c located at the most right of a plurality of zoom-in information is displayed in an enlarged manner on the touch screen 251 of the external terminal 200, the controller 180 (or the controller

280 of the external terminal) may display a third image 1010b different from the first image 900 on the touch screen 251 of the external terminal.

At this time, when the first image and the third image are images satisfying a predetermined condition, the controller 180 (or the controller 280 of the external terminal) may immediately display a part of the third image in an enlarged manner on the touch screen 251 of the external terminal.

In other words, when zoom-in information does not exist in a direction opposite to one direction to which a predetermined type of touch is applied based on the any one zoom-in information, the controller 180 (or the controller 280 of the external terminal) may display an image different from the one image 900 on the touch screen 251 of the external terminal.

When a drag touch other than a flick touch is applied in a state that a part corresponding to any one zoom-in information is displayed in an enlarged manner, the controller 180 (or the controller 280 of the external terminal) may move one image 900. Due to this, a part and another part of the one image may be displayed in an enlarged manner on the touch screen 251 of the external terminal 200.

Furthermore, the present disclosure may not be necessarily limited to a method of displaying a part corresponding to zoom-in information located in a direction opposite to one direction in an enlarged manner when a predetermined type of touch is applied in the one direction. In other words, it may be formed such that when the predetermined type of touch is applied in one direction in a state that a part corresponding to any one zoom-in information is displayed in an enlarged manner, the controller 180 (or the controller 280 of the external terminal) may display a part corresponding to zoom-in information located in one direction based on the any one zoom-in information in an enlarged manner.

Through the foregoing configuration, the present disclosure may provide a UI/UX capable of displaying a plurality of regions in an enlarged manner in an optimal method when there exist a plurality of regions that have been previously displayed in an embodiment for any one image (when a plurality of zoom-in information are linked thereto).

On the other hand, the present disclosure may provide a control method capable of combining a plurality of images using a zoom-in function.

Figure 11A:
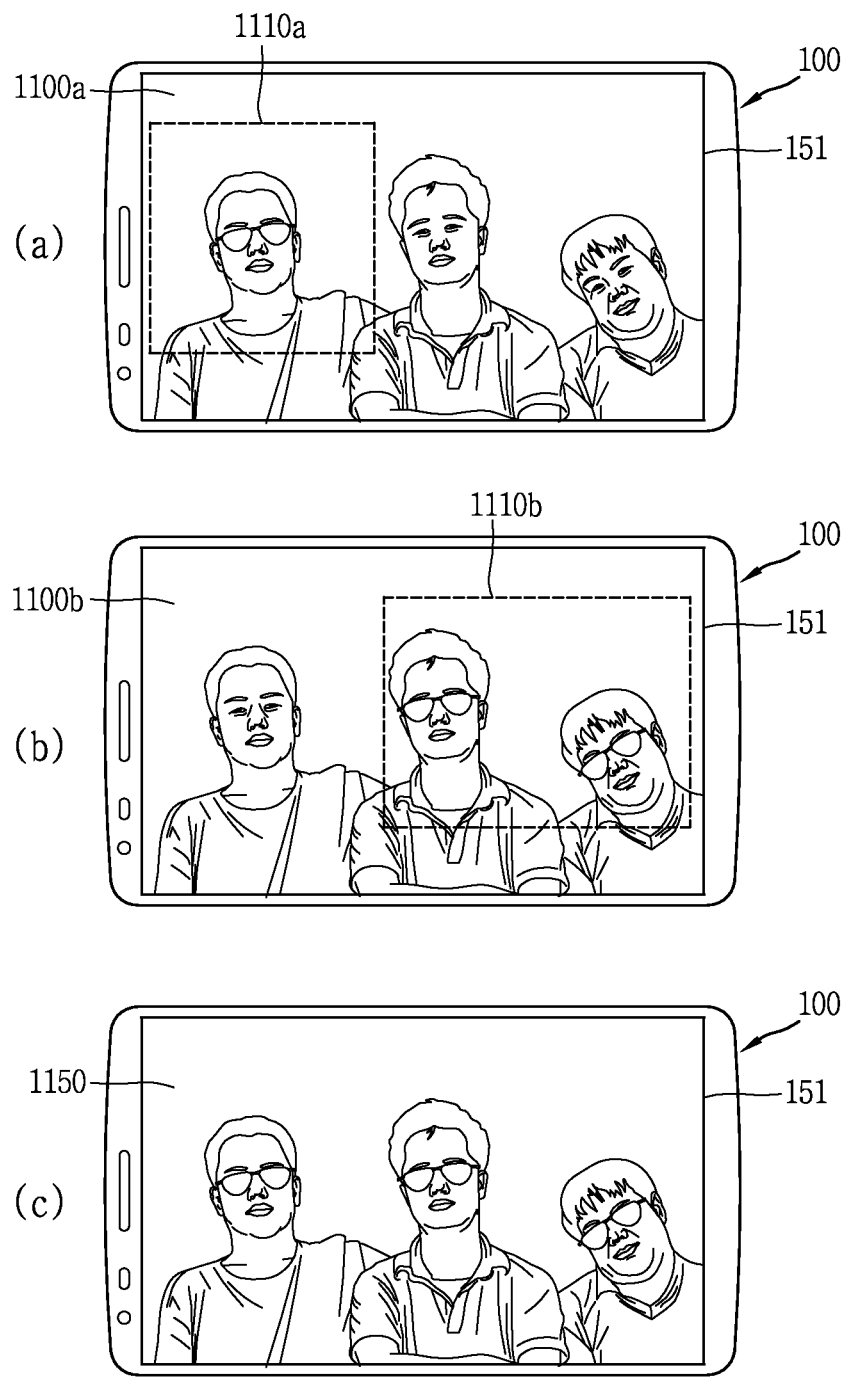
FIGS. 11A and 11B are conceptual views for explaining a method of combining an image using a zoom-in function.
Figure 11B:
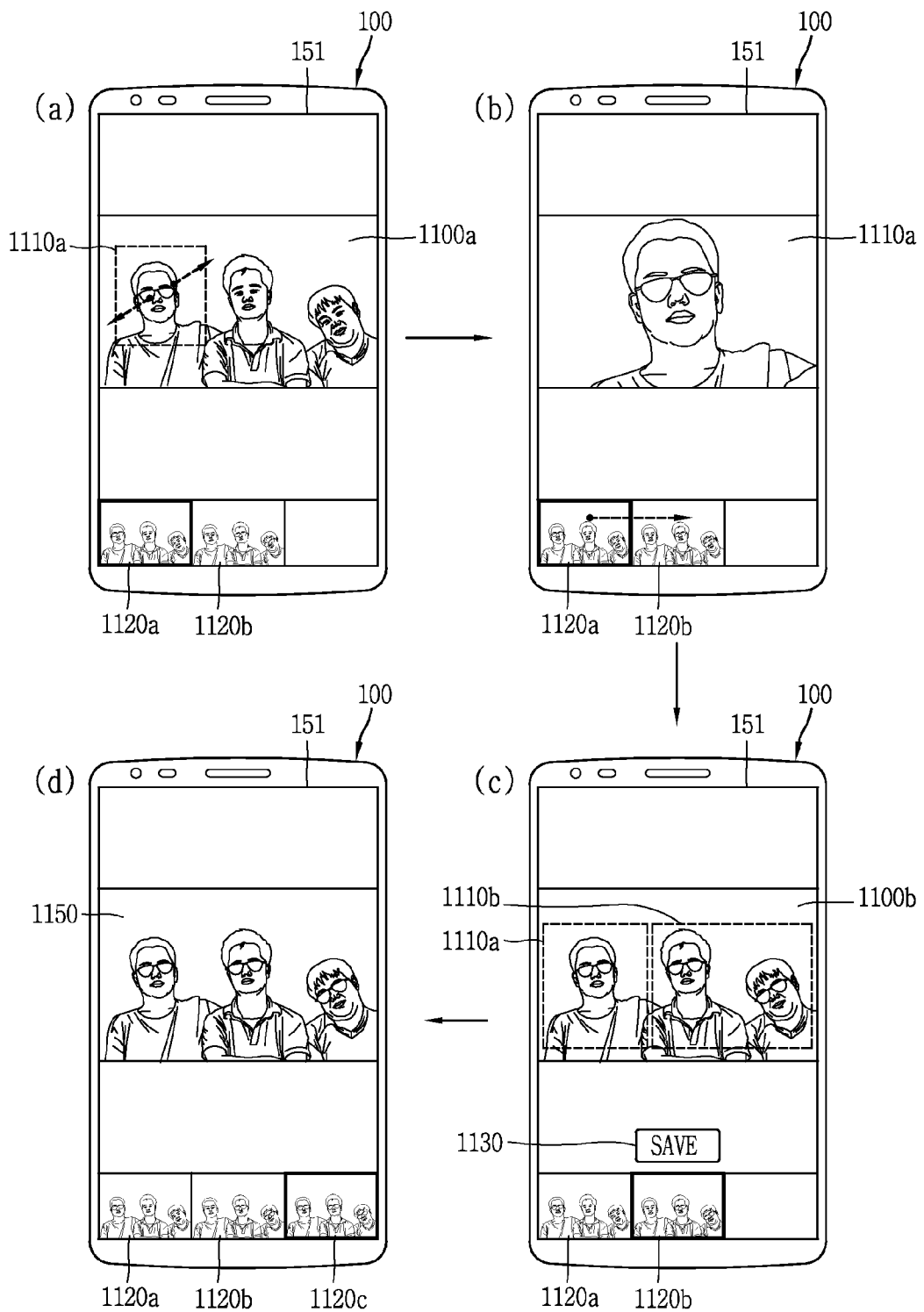

FIGS. 11A and 11B are conceptual views for explaining a method of combining an image using a zoom-in function.

The present disclosure may provide a control method of memorizing (storing) a part displayed in an enlarged manner on a first image, and combining the part with a second image different from the first image using this.

Referring to FIG. 11A, hereinafter, a method of combining a part 1110a of a first image 1100a and a part 1110b of a second image 1100b different from the first image to generate a combined image 1150 will be described.

A thumbnail 1120a of the first image 1100a and a thumbnail 1120b of the second image 1100b may be displayed on the touch screen 151.

As described above, the thumbnail 1120a, 1120b may be displayed in a partial region of the touch screen 151. Furthermore, the thumbnail 1120a, 1120b may be displayed on the touch screen 151 in various ways.

For example, the thumbnail 1120a, 1120b may be displayed based on displaying the whole of the first image on the touch screen 151, displayed based on applying a predetermined type of touch (for example, short touch) in a state that the first image is displayed, displayed based on displaying a part of the first image in an enlarged manner or displayed based on applying a predetermined type of touch (for example, short touch) in a state that a part of the first image is displayed in an enlarged manner.

When a predetermined type of touch (for example, short touch) is applied to a region other than a region displayed with the thumbnail in a state that the thumbnail is displayed, the controller 180 may allow the thumbnail to disappear from the touch screen.

When a predetermined type of touch is applied to the thumbnail 1120a of the first image 1100a in a state that a part 1110a of the first image 1100a is displayed in an enlarged manner, the controller 180 may display the part 1110a of the first image 1100a to overlap with the second image 1100b on the touch screen 151.

For example, when a predetermined type of touch (a touch linked to a zoom-in function, pinch-out touch) is applied to the first image 1100a displayed on the touch screen 151 as illustrated in FIG. 11B(a), the controller 180 may display a part 1110a of the first image 1100a in an enlarged manner on the touch screen 151 as illustrated in FIG. 11B(b).

When a predetermined type of touch is applied to a thumbnail 1120a of the first image in a state that the part 1110a of the first image 1100a is displayed in an enlarged manner as illustrated in FIG. 11B(b), the controller 180 may display the part 1110a of the first image 1100a to overlap with the second image 1100b as illustrated in FIG. 11B(c).

The predetermined type of touch may be a drag touch started from the thumbnail 1120a of the first image and released from the thumbnail 1120b of the second image, for an example. For another example, the predetermined type of touch may be a drag touch started from the part 1110a of the first image 1100a and released from the thumbnail 1120b of the second image or a long touch or double touch applied to the thumbnail 1120a of the first image.

The present disclosure may control the part 1110a of the first image in various ways. For example, in a state that the part 1110a of the first image is overlapped with the second image 1100b, the part 1110a of the first image may be in a selected state (or active state). In this case, the controller 180 may change the display location of the part 1110a of the first image based on a drag touch started from the part 1110a of the first image. Furthermore, the controller 180 may vary the display size of the part 1110a of the first image based on a drag touch started from an edge of the part 1110a of the first image.

Furthermore, when the part 1110a of the first image is in a selected state as illustrated in the above FIG. 11B(c), the controller 180 may display an icon linked to various functions. For example, the various functions may include a delete function, an erase function, a share function, and the like.

The controller 180 may change the part 1110a of the first image in various ways using the icon.

On the other hand, when the part 1110a of the first image is displayed to overlap with the second image 1100b as illustrated in FIG. 11B(c), an icon 1130 linked to a store function may be displayed on the touch screen 151.

When the icon 1130 is selected, the controller 180 may generate an image 1150 in which the part 1110a of the first image is combined with the second image 1100b as illustrated in FIG. 11B(d). The combined image 1150 may include the part 1110a of the first image and the part 1110b of the second image as illustrated in FIG. 11B(c).

However, the present disclosure may not be necessarily limited to this, and when zoom-in information is linked to a first image, the controller 180 may display a part corresponding to the zoom-in information to overlap with the second image on the touch screen 151 based on a drag touch started from a part corresponding to the zoom-in information and released from a thumbnail of the second image.

Through the foregoing configuration, the present disclosure may provide a user interface capable of enlarging his or her desired part and then immediately combining it with another image.

Figure 12A:
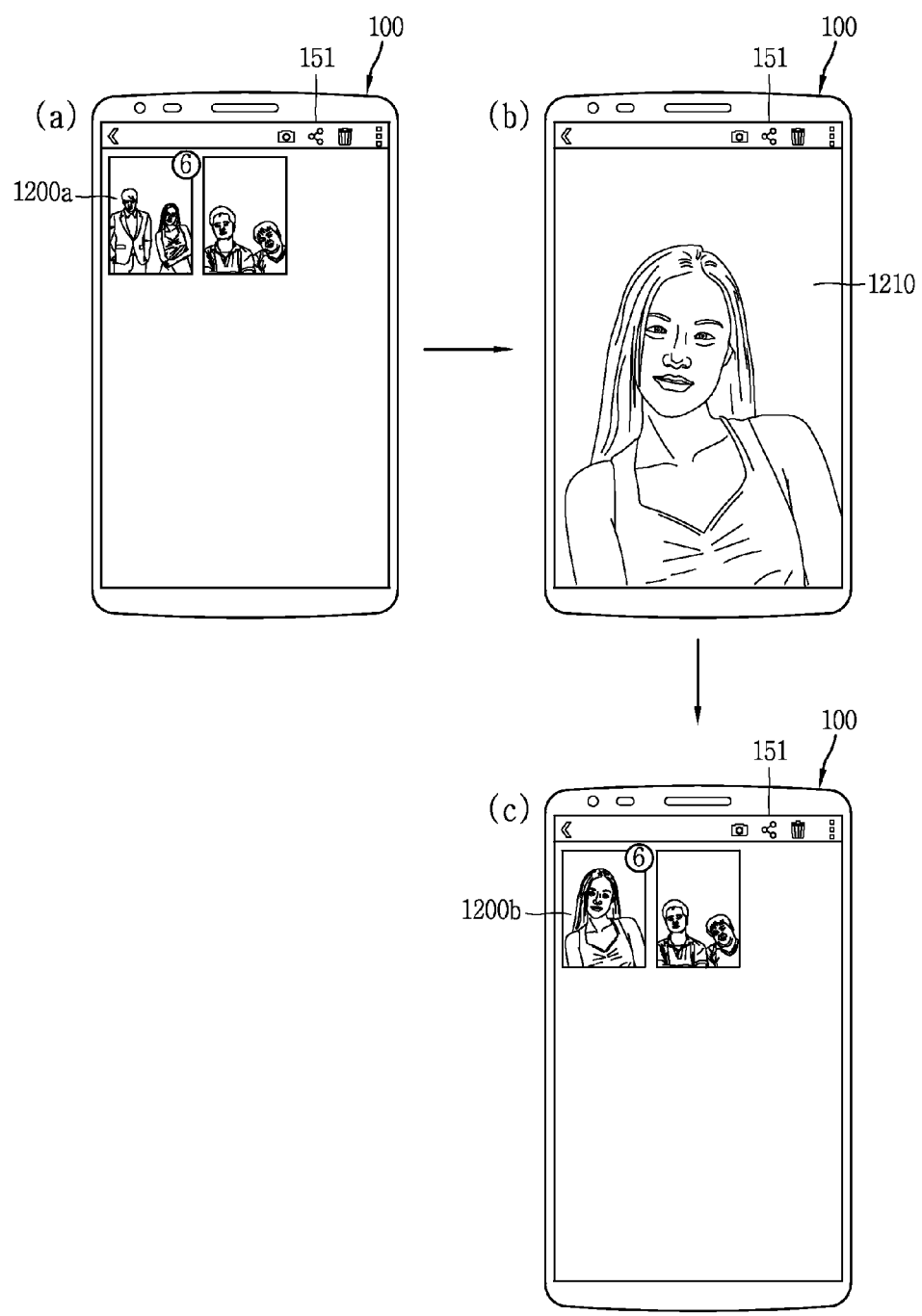
FIGS. 12A and 12B are conceptual views for explaining a method of controlling images satisfying a predetermined condition according to an embodiment of the present disclosure.
Figure 12B:
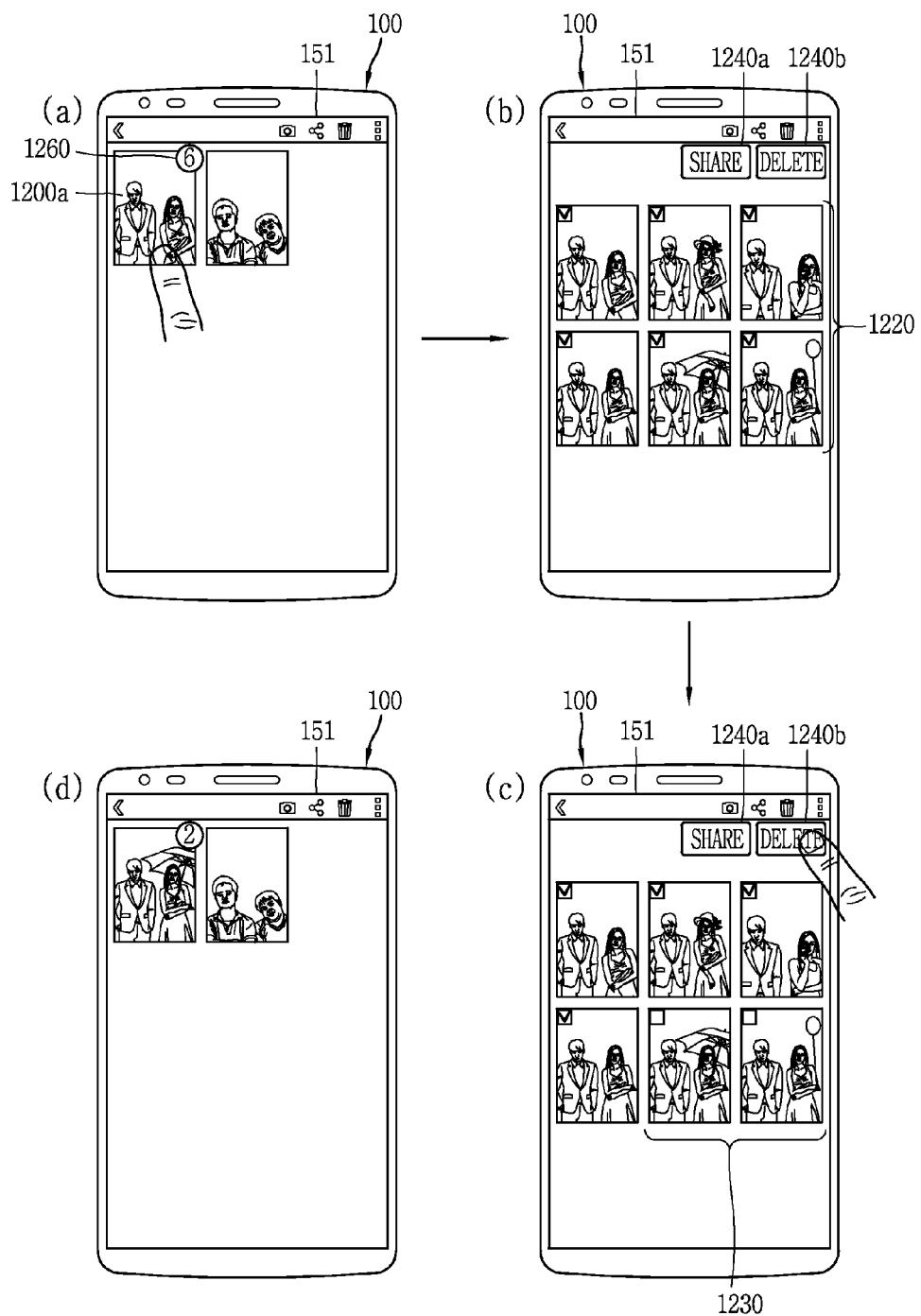

On the other hand, according to the present disclosure, it may be possible to perform an additional function when an image is enlarged. FIGS. 12A and 12B are conceptual views for explaining a method of controlling images satisfying a predetermined condition according to an embodiment of the present disclosure.

Images satisfying a predetermined condition illustrated in FIGS. 2 through 4C may be groups into one group. At this time, a thumbnail 1200a of any one of images satisfying the predetermined condition may be displayed on the touch screen 151 as illustrated in FIG. 12A(a). The drawing of FIG. 12A(a) may be a screen for selecting images stored in the memory 170.

The images satisfying the predetermined condition may be images consecutively captured for a predetermined period of time or images in which the color information of the first image and the second image are identical above a predetermined threshold value.

In this state, any one of the images satisfying the predetermined condition may be enlarged based on a touch (for example, double touch, pinch-out touch) satisfying a predetermined condition. In other words, when a part 1210 of the any one image is displayed in an enlarged manner and then re-enters the screen as illustrated in FIG. 12A(b), the controller 180 may change the thumbnail 1200a to a part 1210 of the any one image that has been displayed in an enlarged manner as illustrated in FIG. 12A(c).

Through the foregoing configuration, the present disclosure may provide a UI capable of easily knowing a part that has been displayed in an enlarged manner among images satisfying a predetermined condition.

On the other hand, the present disclosure may more conveniently control images satisfying the predetermined condition.

For example, when a predetermined type of touch (for example, long touch) is applied to a thumbnail 1200a of any one of images satisfying the predetermined condition as illustrated in FIG. 12B(a), the controller 180 may display all the thumbnails 1220 of images satisfying the predetermined condition as illustrated in FIG. 12B(b). At this time, the controller 180 may immediately select images satisfying the predetermined condition based on the predetermined type of touch being applied thereto.

In other words, images satisfying the predetermined condition may be all automatically selected based on a predetermined type of touch applied to the thumbnail 1200a.

In this case, check boxes indicating selection or non-selection and icons linked to various functions (for example, an icon 1240a linked to a share function, an icon 1240b linked to a delete function) may be displayed on the touch screen 151.

Then, as illustrated in FIG. 12B(c), in a state that the predetermined conditions are all selected, when some 1230 of them are selectively released and then the icon 1240b linked to a delete function is selected (touched), the controller 180 may delete the selected images.

In this case, as illustrated in FIGS. 12B(a) and 12B(b), an indicator 1260 indicating images satisfying a predetermined condition may be changed. Furthermore, when an image corresponding to the thumbnail 1200a is deleted, a thumbnail displayed on the touch screen 151 may be changed to a thumbnail corresponding to any one of the non-deleted images.

Through the foregoing configuration, the present disclosure may provide a user interface capable of allowing a user to more easily select images satisfying a predetermined condition and perform various functions, thereby significantly increasing the user's convenience.

As described above, according to the present disclosure, it may be possible to provide a user interface capable of displaying an image in an optimal manner.

Furthermore, when there is a display request for the second image in a state that a part of the first image is displayed in an enlarged manner, the present disclosure may provide a UI/UX capable of immediately displaying a part of the second image in an enlarged manner without displaying the whole of the second image. Accordingly, when a user views a currently displayed image in an enlarged manner and then wants to view another image in an enlarged manner, the present disclosure may allow him or her not to perform a zoom-in operation again, thereby significantly enhancing the user's convenience.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a touchscreen; and
a controller configured to:
cause the touchscreen to display a first image;
enlarge a portion of the first image in response to a first user input; and
cause the touchscreen to display an enlarged portion of a second image in response to a second user input received while the enlarged portion of the first image is displayed, wherein the first image is different from the second image,
wherein zoom information corresponding to the enlarged portion of the first image is linked the first image, and
wherein the controller is further configured to:
cause the touchscreen to display a portion of the first image corresponding to the zoom information in a direction opposite to direction of a touch applied to the first image, and
cause the touchscreen to display an image different from the first image when zoom information does not exist in the direction opposite to direction of the touch.

2. The mobile terminal of claim 1, wherein the controller is further configured to:
cause the touchscreen to display the enlarged portion of the second image in response to the second user input and when the first image and the second image satisfy a predetermined condition; and cause the touchscreen to display an entire portion of the second image in response to the second user input and when the first image and the second image do not satisfy the predetermined condition.

3. The mobile terminal of claim 2, wherein the predetermined condition is the first image and the second image being images that are consecutively captured or the first image and the second image each include color information that meets a threshold value.

4. The mobile terminal of claim 1, wherein the controller is further configured to:
cause the touchscreen to display thumbnail images respectively corresponding to the first and second images; and
cause the touchscreen to display a portion of the first image to overlap with the second image.

5. The mobile terminal of claim 1, wherein a size of the first image is the same as a size of the second image, and
size and location of the enlarged portion of the first image within an entire portion of the first image corresponds to size and location of the enlarged portion of the second image within an entire portion of the second image.

6. The mobile terminal of claim 5, wherein the controller is further configured to:
recognize an object included in the first image, and
cause the touchscreen to display the enlarged portion of the second image as including an object that corresponds with the recognized object included in the first image.

7. The mobile terminal of claim 6, wherein relative location of the object in the first image is different that relative location of the object included in the second image.

8. The mobile terminal of claim 1, further comprising:
a communication unit configured to perform wireless communication with an external terminal,
wherein the controller is further configured to:
provide, via the communication unit, the zoom information to the external terminal, wherein the zoom information permits the external terminal to display the enlarged portion of the first image on a display.

9. The mobile terminal of claim 1, wherein when a touch for a zoom function is applied to the first image while a plurality of zoom information are linked to the first image, the controller is further configured to:
cause the touchscreen to display a portion of the first image that is nearest to a position at which the touch is applied in an enlarged manner according to the plurality of zoom information.

10. The mobile terminal of claim 9, wherein the controller is further configured to:
cause the touchscreen to enlarge another portion of the first image according to a region at which a touch is applied to the first image when the touch corresponds to any one zoom information among the plurality of zoom information linked to the first image.

11. The mobile terminal of claim 10, wherein the controller is further configured to:
cause the touchscreen to display a portion of the first image corresponding to zoom information different from the any one zoom information when the touch is applied to a first region of the touchscreen, and to display an entire portion of the image when the touch is applied to a second region of the touchscreen different from the first region.

12. A display method for a mobile terminal having a touchscreen, the method comprising:
displaying on the touchscreen a first image;
enlarging a portion of the first image in response to a first user input; and
displaying on the touchscreen an enlarged portion of a second image in response to a second user input received while the enlarged portion of the first image is displayed, wherein the first image is different from the second image, and wherein zoom information corresponding to the enlarged portion of the first image is linked the first image;
displaying, on the touchscreen, a portion of the first image corresponding to the zoom information in a direction opposite to direction of a touch applied to the first image, and
display, on the touchscreen, an image different from the first image when zoom information does not exist in the direction opposite to direction of the touch.

13. The method of claim 12, further comprising:
displaying on the touchscreen the enlarged portion of the second image in response to the second user input and when the first image and the second image satisfy a predetermined condition; and
displaying on the touchscreen an entire portion of the second image in response to the second user input and when the first image and the second image do not satisfy the predetermined condition.

14. The method of claim 13, wherein the predetermined condition is the first image and the second image being images that are consecutively captured or the first image and the second image each include color information that meets a threshold value.

15. The method of claim 12, wherein a size of the first image is the same as a size of the second image, and
size and location of the enlarged portion of the first image within an entire portion of the first image corresponds to size and location of the enlarged portion of the second image within an entire portion of the second image.

16. The method of claim 15, further comprising:
recognize an object included in the first image, and
displaying on the touchscreen the enlarged portion of the second image as including an object that corresponds with the recognized object included in the first image.

* * * * *